United States Patent
Momtaz

(10) Patent No.: US 8,483,267 B2
(45) Date of Patent: Jul. 9, 2013

(54) NON-LINEAR ANALOG DECISION FEEDBACK EQUALIZER

(75) Inventor: Afshin Momtaz, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 29 days.

(21) Appl. No.: 13/152,551

(22) Filed: Jun. 3, 2011

(65) Prior Publication Data

US 2011/0235696 A1    Sep. 29, 2011

Related U.S. Application Data

(63) Continuation of application No. 11/730,079, filed on Mar. 29, 2007, now Pat. No. 7,983,333.

(60) Provisional application No. 60/900,315, filed on Feb. 9, 2007.

(51) Int. Cl.
    *H04L 27/10* (2006.01)

(52) U.S. Cl.
    USPC .......................................... 375/233

(58) Field of Classification Search
    USPC .......................................... 375/233, 229, 232
    See application file for complete search history.

(56) References Cited

U.S. PATENT DOCUMENTS

| | | | |
|---|---|---|---|
| 4,583,234 A | 4/1986 | Ramadan | |
| 7,184,478 B2 | 2/2007 | Popescu et al. | |
| 7,334,010 B2 | 2/2008 | Matoba | |
| 7,483,479 B2 | 1/2009 | Callicotte et al. | |
| 7,522,847 B2 | 4/2009 | Momtaz et al. | |
| 7,542,508 B2 | 6/2009 | Marlett et al. | |
| 7,564,900 B1 | 7/2009 | Roo | |
| 7,738,567 B2 | 6/2010 | Miller et al. | |
| 2004/0240539 A1 | 12/2004 | Shanbhag et al. | |
| 2004/0258183 A1* | 12/2004 | Popescu et al. | 375/350 |
| 2004/0264562 A1 | 12/2004 | Wu et al. | |
| 2005/0135471 A1 | 6/2005 | Tonietto et al. | |
| 2005/0254569 A1 | 11/2005 | Momtaz | |
| 2005/0271136 A1 | 12/2005 | Chung et al. | |
| 2006/0239341 A1 | 10/2006 | Marlett et al. | |
| 2007/0110199 A1 | 5/2007 | Momtaz et al. | |
| 2008/0159415 A1 | 7/2008 | Miller et al. | |
| 2008/0192816 A1 | 8/2008 | Momtaz | |

* cited by examiner

*Primary Examiner* — Jaison Joseph

(74) *Attorney, Agent, or Firm* — Sterne, Kessler, Goldstein & Fox P.L.L.C.

(57) ABSTRACT

An equalizer that compensates for non-linear effects resulting from a transmitter, a receiver, and/or a communication channel in a communication system. A non-linear decision feedback equalizer compensates for the non-linear effects impressed onto a received symbol by selecting between equalization coefficients based upon a previous received symbol. The received symbol may be represented in form of logic signals based on the binary number system. When the previous received symbol is a binary zero, the non-linear decision feedback equalizer selects an equalization coefficient corresponding to binary zero to compensate for the non-linear effects impressed onto the received symbol. When the previous received symbol is a binary one, the non-linear decision feedback equalizer selects an equalization coefficient corresponding to binary one to compensate for the non-linear effects impressed onto the received symbol.

22 Claims, 13 Drawing Sheets

NON-LINEAR ANALOG DECISION FEEDBACK EQUALIZER

CROSS REFERENCE TO RELATED APPLICATIONS

This patent application is a continuation of U.S. patent application Ser. No. 11/730,079, filed Mar. 29, 2007, which claims the benefit of U.S. Provisional Patent Application No. 60/900,315 filed Feb. 9, 2007, both of which are incorporated herein by reference in their entirety.

FIELD OF THE INVENTION

The present invention relates generally to adaptive equalizers and specifically to an analog non-linear decision feedback equalizer.

BACKGROUND

A communication system typically involves transmitting an information signal from a transmitter to a receiver over a communication channel. The communication channel can include a microwave radio link, a satellite channel, a fiber optic cable, or a copper cable to provide some examples. A communication channel contains a propagation medium that the information signal passes through before reception by the receiver.

The propagation medium of the communication channel may introduce distortion into the transmitted information signal causing a received information signal to differ from the transmitted information signal. Transmission over a multiplicity of paths of different and variable lengths, bandwidth limitations, or transmission at a frequency greater than the capability of the communication channel to provide some examples may introduce distortion into the transmitted information signal. This distortion may cause the received symbols within the received information signal to differ in amplitude and temporal duration from the transmitted information signal. The difference in amplitude and duration may lead to intersymbol interference (ISI) between adjacent symbols within the received information signal. The consequent overlap of individual symbols caused by intersymbol interference may reduce the ability of the receiver to reliably distinguish between individual signal elements of the received information signal.

Communication systems may use an adjustable filter in the form of an equalizer to reduce the effect of the distortion caused by the communication channel. Conventional equalizers may compensate for the distortion caused by a linear communication channel. Linear communication channels may be characterized by linear transfer functions relating the symbols of the received information signal to the symbols of the transmitted information signal. Compensation for the distortion caused by the linear communication channel involves implementing the conventional equalizer with a transfer function that is an inverse of the linear transfer function of the communication channel.

However, the propagation medium of the communication channel may also introduce non-linear distortion into the symbols of the received information signal for which the conventional equalizer may not compensate. Techniques to compensate for the non-linear distortion caused by the communication channel have been implemented within the digital domain, but that is not the case for the analog domain, especially for high speed analog applications. Therefore, what is needed an equalizer that is capable of compensating for the non-linear effects resulting from the communication channel in a communication system for high-speed analog applications.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1A:
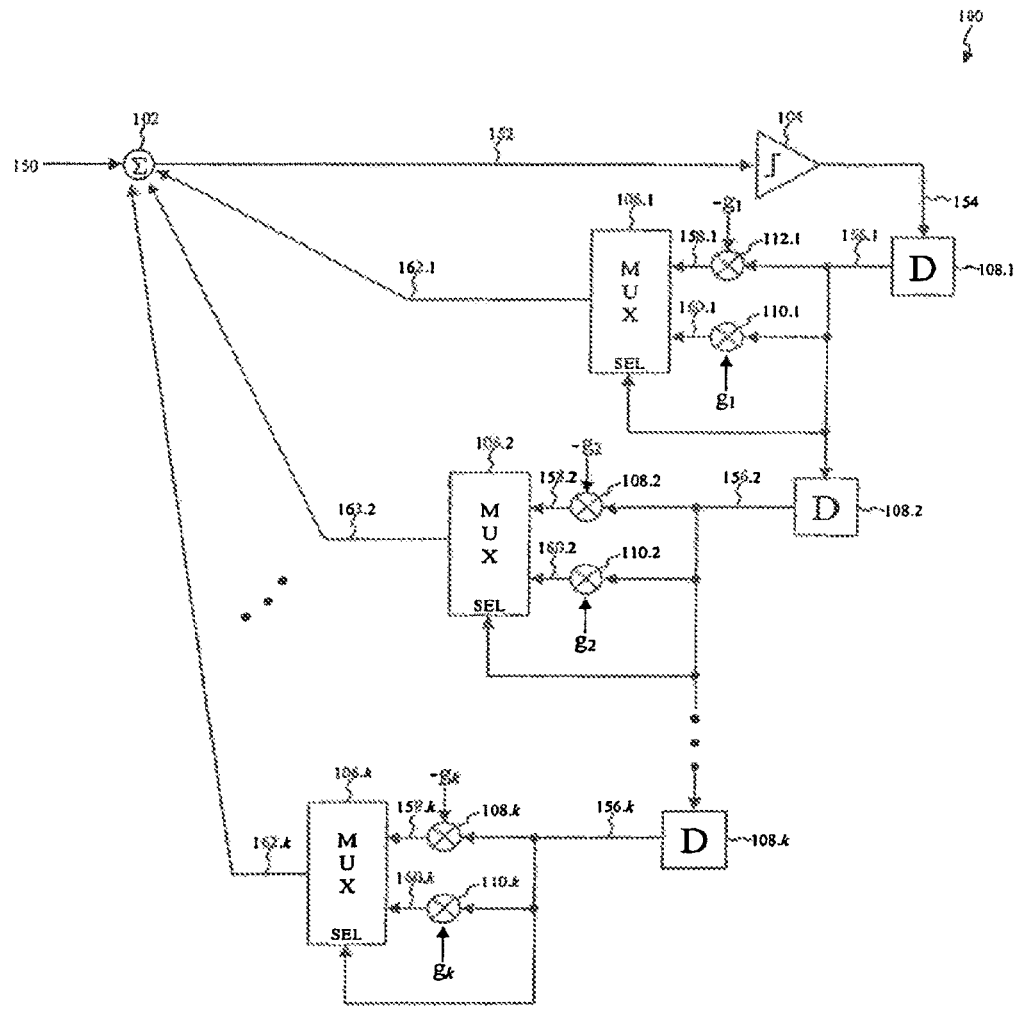
FIG. 1A is an illustration of a block diagram of a multi-tap conventional linear decision feedback equalizer.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

FIG. 1A is an illustration of a block diagram of a multi-tap conventional linear decision feedback equalizer (DFE). A linear DFE 100 operates upon a received information signal 150 to produce an equalized output 152. In an exemplary embodiment, the received information signal 150 may be a data stream from a fiber optic cable. In another exemplary embodiment, the received information signal 150 is in a form of logic values based on the binary number system. The two symbols most commonly chosen to represent the two logic values taken on by binary symbols are binary zero and binary one. In this exemplary embodiment, a transmitter may be implemented to encode a transmitted information signal according to an on-off signaling scheme whereby the symbol binary one is represented by transmitting a symbol of constant amplitude for the duration of the symbol, and symbol binary zero is represented by switching off the symbol. In a further exemplary embodiment, the transmitter may be implemented to encode the transmitted information signal according to a non-return-to-zero (NRZ) scheme whereby symbols of equal positive and negative amplitudes represent the symbols binary one and binary zero.

During transmission, a propagation medium of a communication channel may introduce distortion into the transmitted information signal causing the received information signal 150 to differ from the transmitted information signal. The linear DFE 100 may compensate for the distortion caused by a linear communication channel. However, the propagation medium of the communication channel may also introduce a non-linear distortion into the symbols of the received information signal 150 for which the linear DFE 100 may not compensate.

The linear DFE 100 utilizes a summation network 102, a slicer module 104, a multiplex 106, a delay module 108, a multiplier 110, and a multiplier 112 to compensate for the distortion impressed upon a corresponding symbol within the received information signal 150 in the presence of the linear communication channel. As shown in FIG. 1A, the slicer module 104 digitizes the equalized output 152 according to a threshold to produce the slicer output 154. The threshold value may be adjusted according to the encoding of the transmitted information signal. For example, if the transmitted information signal is encoded according to the NRZ scheme, the threshold value of the slicer 104 may be assigned to the statistical mean of the positive and negative amplitudes representing the symbols binary one and binary zero. In an exemplary embodiment, the symbols of the equalized output 152 that are greater than the threshold value of the slicer 104 are assigned to binary one, while the symbols of the equalized output 152 that are less than the threshold value of the slicer 104 are assigned to binary zero.

The delay module 108 comprises of k delay modules 108.1 though 108.$k$ to delay the slicer output 154 by k symbols to produce a corresponding delayed slicer output 156.1 through 156.$k$. In an exemplary embodiment, the delay module 108 is implemented using a flip-flop to delay the slicer output 154 according to a clock signal. The flip-flop is well known by those skilled in the art and may be implemented using in the analog domain, the digital domain, or a combination of the analog and the digital domain. The quantity k may also be referred to as the number of equalization taps or taps in the linear DFE 100. In other words, the number of taps represents the number of previous symbols of the received information signal 150 used by the linear DFE 100 to remove the distortion caused by a linear communication channel from the current symbol of the received information signal 150. For example, the linear DFE 100 may compensate for distortion caused by the linear communication channel resulting from the previous symbol by delaying the slicer output 154 by the duration of a single symbol to produce a delayed slicer output 156.1. Similarly, the linear DFE 100 may compensate for distortion caused by the linear communication channel resulting from the k previous symbols by delaying the slicer output 154 by the duration of a k symbols to produce delayed re-timer outputs 156.1 through 156.$k$.

The multiplier 112 comprises of k multipliers 112.1 through 112.$k$ to multiply a corresponding equalization coefficient $-g_1$ through $-g_k$ with a corresponding delayed slicer output 156.1 through 156.$k$ to generate the corresponding binary zero weighted output 158.1 through 158.$k$. For example, multiplier 112.1 multiplies the equalization coefficient $-g_1$ with the delayed re-timer output 156.1 to generate the binary zero weighted output 158.1. Similarly, the multiplier 110 comprises of k multipliers 110.1 through 110.$k$ to multiply a corresponding equalization coefficient $g_1$ through $g_k$ with a corresponding delayed slicer output 156.1 through 156.$k$ to generate the corresponding binary one weighted output 160.1 through 160.$k$. For example, multiplier 110.1 multiplies the equalization coefficient $g_1$ with delayed slicer output 156.1 to generate the binary one weighted output 160.1. The equalization coefficient $g_1$ and the equalization coefficient $-g_1$ are substantially equal in magnitude. In other words, the equalization coefficient $-g_1$ is a negative representation of the equalization coefficient $g_1$.

The multiplexer 106 comprises of k multiplexers 106.1 through 106.$k$ to produce a corresponding weighted output 162.1 through 162.$k$ by selecting between the corresponding binary zero weighted output 158.1 through 158.$k$ or the corresponding binary one weighted output 160.1 through 160.$k$ based upon the corresponding delayed slicer output 156.1 through 156.$k$. For example, if the delayed slicer output 156.1 is assigned a value of binary zero, the multiplexer 106.1 selects the binary zero weighted output 158.1. Likewise, if the delayed slicer output 156.1 is assigned a value of binary one, the multiplexer 106.1 selects the binary one weighted output 160.1.

The weighted outputs 162.1 through 162.$k$ represent the amount of distortion caused by the linear communication channel resulting from a corresponding symbol. For example, the weighted output 162.1 represents the distortion caused by the linear communication channel resulting from the previous symbol, the weighted output 162.2 represents the distortion caused by the linear communication channel resulting from the second previous symbol, and the weighted output 162.*k* represents the distortion caused by the linear communication channel resulting from the k$^{th}$ previous symbol. The summation network 102 compensates for the distortion caused by the linear communication channel by combining the corresponding weighted outputs 162.1 through 162.*k* with the received information signal 150 to produce the equalized output 152. The equalized output 152 contains substantially less distortion when compared with the received information signal 150 in the presence of the linear communication channel.

Figure 1B:
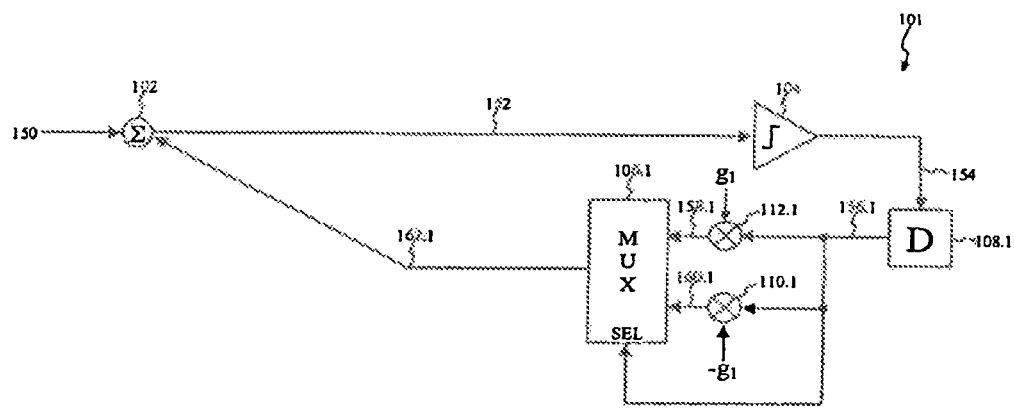
FIG. 1B is an illustration of a block diagram of a single tap conventional linear decision feedback equalizer.

FIG. 1B is an illustration of a block diagram of a single tap conventional linear decision feedback equalizer (DFE). A linear DFE 101 is an exemplary embodiment of the linear DFE 100 containing an individual or a single tap. The linear DFE 101 operates upon a received information signal 150 to produce an equalized output 152. As with the linear DFE 100, the linear DFE 101 may compensate for the distortion caused by a linear communication channel. However, the propagation medium of the communication channel may also introduce non-linear distortion into the symbols of the received information signal for which the linear DFE 101 may not compensate.

The linear DFE 101 utilizes the summation network 102, the slicer module 104, the multiplexer 106.1, the delay module 108.1, the multiplier 110.1 and the multiplier 112.1 to compensate for the distortion impressed upon a corresponding symbol within the received information signal 150 in the presence of the linear communication channel. The slicer module 104 generates a slicer output 154 by digitizing the content of the equalized output 152 according to a threshold value.

The delay module 108.1 generates a delayed slicer output 156.1 by delaying the slicer output 154 by the duration of one symbol. In this exemplary embodiment, the linear DFE 101 may compensate for distortion caused by the linear communication channel resulting from the previous symbol by delaying the slicer output 154 by the duration of a single symbol to produce a delayed slicer output 156.1.

The multiplier 112.1 multiplies the equalization coefficient $-g_1$ with the delayed slicer output 156.1 to generate the binary zero weighted output 158.1. Similarly, the multiplier 110.1 multiplies the equalization coefficient $g_1$ with the delayed slicer output 156.1 to generate the binary one weighted output 160.1. The equalization coefficient $g_1$ and the equalization coefficient $-g_1$ are substantially equal in magnitude. In other words, the equalization coefficient $-g_1$ is a negative representation of the equalization coefficient $g_1$.

The multiplexer 106.1 produces the weighted output 162.1 by selecting between the binary zero weighted output 158.1 or the binary one weighted output 160.1 based upon the corresponding delayed slicer output 156.1. For example, if the delayed slicer output 156.1 is assigned a value of binary zero, the multiplexer 106.1 selects the binary zero weighted output 158.1. Likewise, if the delayed slicer output 156.1 is assigned a value of binary one, the multiplexer 106.1 selects the binary one weighted output 160.1.

The weighted output 162.1 represents the amount of distortion caused by the linear communication channel resulting from a previous symbol. The summation network 102 compensates for the distortion caused by the linear communication channel by combining the weighted outputs 162.1 with the received information signal 150 to produce the equalized output 152. The equalized output 152 contains substantially less distortion when compared with the received information signal 150 in the presence of the linear communication channel.

Figure 2A:
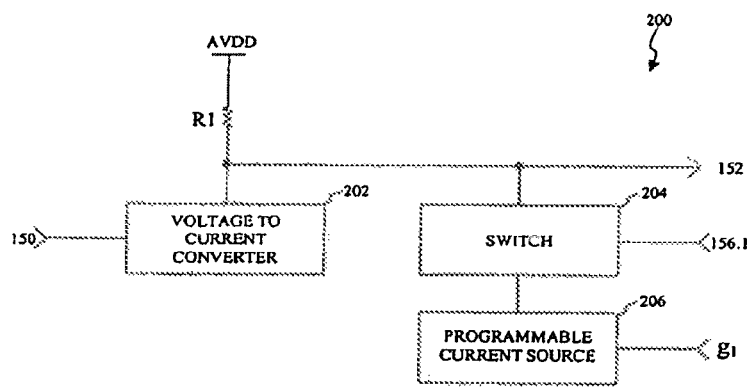
FIG. 2A is an illustration of a block diagram of a current domain implementation of a conventional linear decision feedback equalizer.

FIG. 2A is an illustration of a block diagram 200 of a current domain implementation of a summer and a multiplier of a conventional linear decision feedback equalizer. The summation of the received information signal 150 and the weighted output 162 as shown in FIG. 1A and FIG. 1B, may occur in the current domain as opposed to the voltage domain. Summation of the received information signal 150 and the weighted output 162 in the current domain allows for greater speed as compared to summing the received information signal 150 and the weighted output 162 in the voltage domain. A voltage to current converter 202 converts the information signal 150 from a voltage to a corresponding current. More specifically, the voltage to current converter 202 allows a current domain representation of the information signal 150 to flow through a resistor R1 to contribute to the equalized output 152. The voltage to current converter 202 may be implemented in the analog domain, the digital domain, or a combination of the analog and digital domains using any suitable means such as a transimpedance amplifier or an operational amplifier to provide some examples.

A programmable current source 206 generates the equalization coefficient $g_1$ based upon a digital control word denoted as $g_1$ in FIG. 2A. The programmable current source 206 sources or sinks a current domain representation of the equalizer coefficient $g_1$. In an exemplary embodiment, the equalizer coefficient $g_1$ may be implemented using a digital code containing N bits allowing for programmability. The programmable current source 206 converts the digital code representation of the equalizer coefficient $g_1$ from a digital signal into an analog current. The magnitude of the analog current is relative to the digital code representation of the equalizer coefficient $g_1$.

Based upon the value of the delayed slicer output 156.1, a switch 204 determines whether the programmable current source 206 sources or sinks the current domain representation of the equalizer coefficient $g_1$. In other words, the switch 204 either adds the current domain representation of the equalizer coefficient $g_1$ to the equalized output 152 or subtracts the current domain representation of the equalizer coefficient $g_1$ from the equalized output 152 depending on the value of the delayed slicer output 156.1. For example, if the delayed slicer output 156.1 represents a binary zero, the switch 204 sinks or subtracts the current domain representation of the equalizer coefficient $g_1$ from the equalized output 152. Similarly, if the delayed slicer output 156.1 represents a binary one, the switch 204 sources or adds the current domain representation of the equalizer coefficient $g_1$ to the equalized output 152.

The current domain representation of the equalizer coefficient $g_1$ from the programmable current source 206 combines with a corresponding current domain representation of the received information signal 150 from the voltage to current converter 202 to produce the equalized output 152. For example, if the delayed slicer output 156.1 corresponds to a binary zero, the equalized output 152 corresponds to the difference between the current domain representation of the information signal 150 and the current domain representation of the equalizer coefficient $g_1$. Similarly, if the delayed slicer output 156.1 corresponds to a binary one, the equalized output 152 corresponds to the combination of the current domain representation of the information signal 150 and the current domain representation of the equalizer coefficient $g_1$.

Figure 2B:
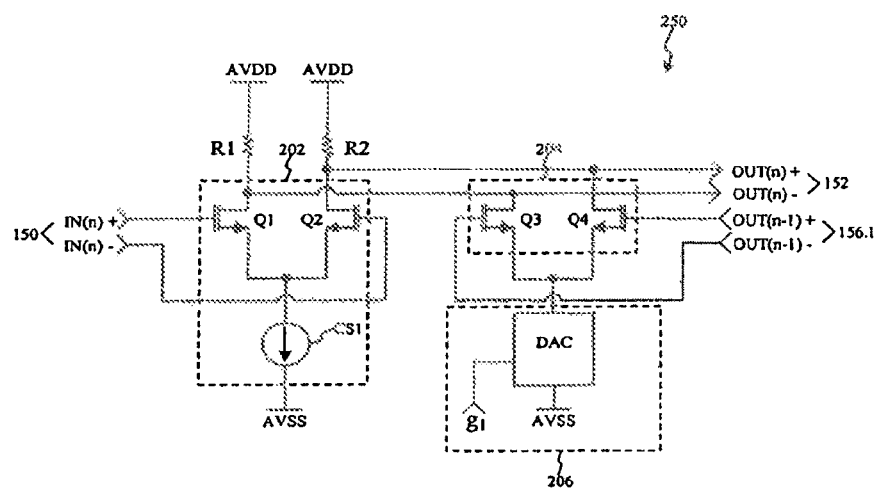
FIG. 2B is an illustration of a transistor level implementation of a current domain implementation of a conventional linear decision feedback equalizer.

FIG. 2B is an illustration of a transistor level implementation 250 of a summer and a multiplier of a conventional linear decision feedback equalizer. More specifically, FIG. 2B demonstrates an exemplary implementation of the voltage to current converter 202, the switch 204, and the programmable current source 206 as discussed in FIG. 2A using n-type metal oxide semiconductor (NMOS) transistors. In this exemplary embodiment, IN(n)+ and IN(n)− represent a differential implementation of the received information signal 150. Similarly, OUT(n)+ and OUT(n)− represent a differential implementation of the equalized output 152. Likewise, OUT(n−1)+ and OUT(n−1)− represent a differential implementation of the delayed slicer output 156.1.

The voltage to current converter 202 converts the differential signal IN(n)+ and IN(n)− from a representation in the voltage domain to a representation in the current domain using a first differential pair formed by a transistor Q1 and a transistor Q2. The voltage to current converter 202 converts the differential signal IN(n)+ and IN(n)− to a current by outputting a corresponding current that flows through either resistor R1 or resistor R2 based on the differential signal IN(n)+ and IN(n)−. In other words, when the differential signal IN(n)+ is greater than a threshold voltage of transistor Q1, a current source CS1 sources a current to resistor R1. As a result, a current domain representation of the differential signal IN(n)+ contributes to the differential signal OUT(n)−. Likewise, when the differential signal IN(n)− is greater than or equal to a threshold voltage of transistor Q2, the current source CS1 sources a current to resistor R2. As a result, a current domain representation of the differential signal IN(n)− contributes to the differential signal OUT(n)+.

A programmable current source 206 produces a current domain representation of the equalizer coefficient $g_1$ using a digital to analog converter (DAC). More specifically, the digital to analog converter sources a current domain representation of the equalizer coefficient $g_1$ to either the differential signal OUT(n)+ or the differential signal OUT(n)− depending on the delayed slicer output 156.1. In an exemplary embodiment, the equalizer coefficient $g_1$ may be implemented using a digital code containing N bits allowing for programmability. The programmable current source 206 converts the digital code representation of the equalizer coefficient $g_1$ from a digital signal into an analog current. The magnitude of the analog current is relative to the digital code representation of the equalizer coefficient $g_1$.

The switch 204 determines whether the programmable current source 206 sources a current domain representation of the equalizer coefficient $g_1$ to either the differential signal OUT(n)+ or the differential signal OUT(n)− using a differential pair formed by a transistor Q3 and a transistor Q4. In an exemplary embodiment, the transistor Q3 and the transistor Q4 are matched transistors whose size may be given as $$\frac{N*W}{L},$$

where W represents the width of the transistor, L represents the length of the transistor, and N represents an integer value. When the differential signal OUT(n−1)+ is greater than or equal to a threshold voltage of transistor Q4, the programmable current source 206 sources a current domain representation of the equalizer coefficient $g_1$ to the differential signal OUT(n)+. Likewise, when the differential signal OUT(n−1)− is greater than or equal to a threshold voltage of transistor Q3, the programmable current source 206 sources a current domain representation of the equalizer coefficient $g_1$ to the differential signal OUT(n)−.

The current domain representation of the equalizer coefficient $g_1$ from the programmable current source 206 combines with a corresponding current domain representation of the differential signal IN(n) from the voltage to current converter 202 to produce the differential signal OUT(n). For example, if the delayed slicer output 156.1 corresponds to a binary zero, the differential signal OUT(n−1)+ corresponds to a binary zero and the differential signal OUT(n−1)− corresponds to a binary one. As a result, the differential signal OUT(n)+ includes the current domain representation of the differential signal IN(n), whereas the differential signal OUT(n)− additionally includes the current domain representation of the equalizer coefficient $g_1$ from the programmable current source 206. Similarly, if the delayed slicer output 156.1 corresponds to a binary one, the differential signal OUT(n−1)+ corresponds to a binary one and the differential signal OUT(n−1)− corresponds to a binary zero. As a result, the differential signal OUT(n)− includes the current domain representation of the differential signal IN(n), whereas the differential signal OUT(n)+ additionally includes the current domain representation of the equalizer coefficient $g_1$ from the programmable current source 206.

Further discussion of the transistor level implementation 250 of a summer and a multiplier of a linear decision feedback equalizer is given in U.S. patent application Ser. No. 10/847,829, entitled "Decision Feedback Equalizer Circuit," filed on May 18, 2004, which is incorporated by reference in its entirety.

From the discussion of FIG. 1A and FIG. 1B, the linear DFE 100 as well as the linear DFE 101 may compensate for the distortion caused by a linear communication channel. A linear communication channel may be characterized by a linear transfer function relating the symbols of a received information signal to the symbols of the transmitted information signal. For a linear communication channel, the distortion associated with either a binary zero or a binary one is symmetrical. In other words, the interference impressed onto a current symbol with the received information signal 150 from a previous symbol is symmetrical or similar, independent of whether the current symbol with the received information signal 150 is a binary zero or a binary one. As a result, identical equalizer coefficients $g_1$ through $g_k$ for the linear DFE 100 or an identical equalizer coefficient $g_1$ for the linear DFE 101 may be used regardless the value of the current symbol with the received information signal 150. For example, identical equalizer coefficients $g_1$ through $g_k$ may used whether the current symbol with the received information signal 150 is a binary zero or a binary one.

However, the propagation medium of the communication channel may also introduce non-linear distortion into the symbols of the received information signal for which neither the linear DFE 100 nor the linear DFE 101 may not compensate. For example, for the communication channel comprising of a fiber optic cable, a condition referred as overshoot and a complementary condition known as undershoot may introduce a non-linear distortion into the symbols of the received information signal.

Overshoot may occur when a transition within the transmitted information signal is from a lower value to a higher value such as a binary zero to a binary one to provide an example. The corresponding symbol with the received information signal 150 may take a transitory value that is higher than the final value. Similarly, undershoot may occur when a transition within the transmitted information signal is from a higher value to a lower value such as a binary one to a binary zero to provide an example. The corresponding symbol with the received information signal 150 may take a transitory value that is lower than the final value. The effect of overshoot and undershoot on the received information signal 150 may differ. For example, the effect of overshoot on the received information signal 150 may be either greater than the effect of undershoot on the received information signal 150. As a result, overshoot and undershoot may cause non-linear distortions that neither the linear DFE 100 nor the linear DFE 101 may compensate for. Other examples of non-linearities in a fiber optic cable communication channel may result from laser drivers that generate the transmitted signal, the fiber optic cable that comprises the communication channel, amplifiers within the transmission path, or parasitic amplitude and/or phase modulation of the transmitted signal to provide some examples.

Unlike the linear communication channel, the distortion caused by a non-linear communication channel associated with a binary zero or a binary one is not symmetrical. In other words, the interference impressed onto a current symbol with the received information signal 150 from a previous symbol is asymmetrical or dissimilar and depends whether the current symbol with the received information signal 150 is a binary zero or a binary one. Because of the asymmetrical properties of the non-linear communication channel, neither the linear DFE 100 nor the linear DFE 101 may compensate for the non-linear distortion. As shown in FIG. 1A and FIG. 1B, the linear DFE 100 and the linear DFE 101 contain equalization coefficients that are independent of whether the current symbol with the received information signal 150 is a binary zero or a binary one. As a result of the non-linear distortion caused by the communication channel, optimization of the equalization coefficients for a single binary value, for example a binary zero, results in a sub-optimal equalization coefficient for the other value, for example a binary one.

Figure 3A:
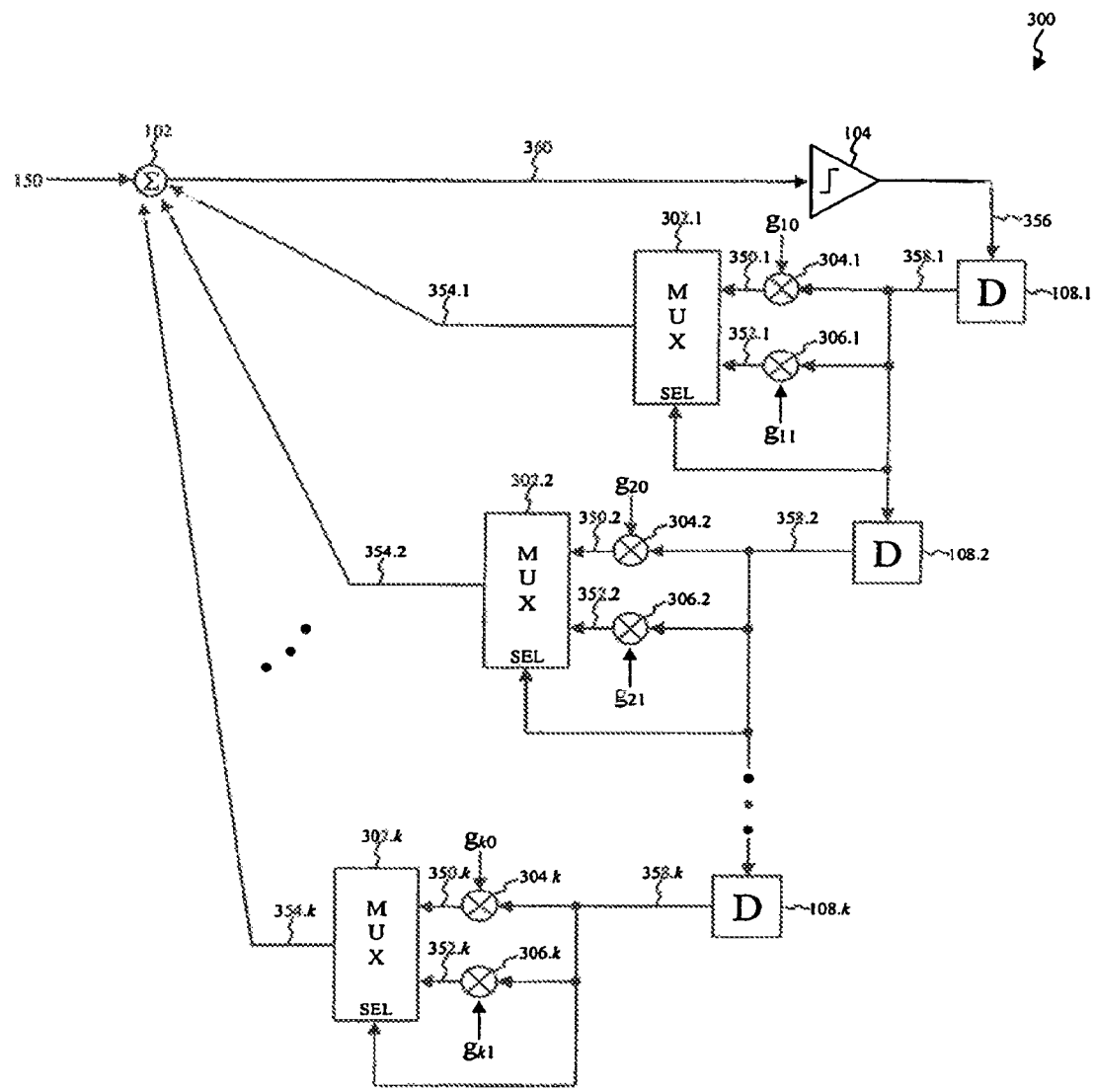
FIG. 3A is an illustration of a block diagram of a multi-tap non-linear decision feedback equalizer according to an exemplary embodiment of the present invention.

FIG. 3A is an illustration of a block diagram of a multi-tap non-linear decision feedback equalizer according to an exemplary embodiment of the present invention. Unlike either the linear DFE 100 or the linear DFE 101, the non-linear DFE 300 contains equalization coefficients that are dependent upon whether a previous symbol with the received information signal 150 is a binary zero or a binary one. As a result, the non-linear DFE 300 may compensate for the distortion caused by the linear communication channel and the non-linear communication channel.

The non-linear DFE 300 utilizes the summation network 102, the slicer module 104, the delay module 108, a multiplexer 302, a multiplier 306, and a multiplier 304 to compensate for the intersymbol interference impressed upon a corresponding symbol within the received information signal 150 in the presence of either the non-linear or the linear communication channel. As shown in FIG. 3A, the slicer module 104 digitizes the equalized output 360 according to a threshold to produce the slicer output 356. The threshold value may be adjusted according to the encoding of the transmitted information signal. For example, if the transmitted information signal is encoded according to the NRZ scheme, the threshold value of the slicer 104 may be assigned to the statistical mean of the positive and negative amplitudes representing the symbols binary one and binary zero. In an exemplary embodiment, the symbols of the equalized output 360 that are greater than the threshold value of the slicer 104 are assigned to binary one, while the symbols of the equalized output 360 that are less than the threshold value of the slicer 104 are assigned to binary zero.

The delay module 108 comprises of k delay modules 108.1 though 108.k to delay the slicer output 356 by k symbols to produce a corresponding delayed slicer output 358.1 through 358.k. In this exemplary embodiment, the non-linear DFE 301 may compensate for distortion caused by the linear communication channel and the non-linear communication channel resulting from the previous symbol by delaying the slicer output 356 by the duration of a single symbol to produce a delayed slicer output 358.1. Similarly, the non-linear DFE 301 may compensate for distortion caused by the linear communication channel and the non-linear communication channel resulting from the k previous symbols by delaying the slicer output 356 by the duration of a k symbols to produce delayed re-timer outputs 358.1 through 358.k.

The multiplier 304 comprises of k multipliers 304.1 through 304.k to multiply a corresponding equalization coefficient $g_{10}$ through $g_{k0}$ with a corresponding delayed slicer output 358.1 through 358.k to generate the corresponding binary zero weighted outputs 350.1 through 350.k. For example, multiplier 304.1 multiplies the equalization coefficient $g_{10}$ with the delayed re-timer output to generate the binary zero weighted output 350.1. Similarly, the multiplier 306 comprises of k multipliers 306.1 through 306.k to multiply a corresponding equalization coefficient $g_{11}$ through $g_{k1}$ with a corresponding delayed slicer output 358.1 through 358.k to generate the corresponding binary one weighted outputs 352.1 through 352.k. For example, multiplier 306.1 multiplies the equalization coefficient $g_{10}$ with the delayed re-timer output 358.1 to generate the binary one weighted output 352.1. Resultant from the asymmetrical properties of the non-linear communication channel, the equalization coefficient $g_{10}$ through $g_{k0}$ and a corresponding equalization coefficient $g_{11}$ through $g_{k1}$ may not be of substantially equal magnitude. In other words, the equalization coefficient $g_{10}$ through $g_{k0}$ may differ from the corresponding equalization coefficient $g_{11}$ through $g_{k1}$.

The multiplexer 302 comprises of k multiplexers 302.1 through 302.k to produce a corresponding weighted output 354.1 through 354.k by selecting between the corresponding binary zero weighted outputs 350.1 through 350.k or the corresponding binary one weighted outputs 352.1 through 352.k based upon the corresponding delayed slicer output 358.1 through 358.k. For example, if the delayed slicer output 358.1 is assigned a value of binary zero, the multiplexer 302.1 selects the binary zero weighted output 350.1. Likewise, if the delayed slicer output 358.1 is assigned a value of binary one, the multiplexer 302.1 selects the binary one weighted output 352.1.

The weighted outputs 354.1 through 354.k represent the amount of distortion caused by the linear and the non-linear communication channel resulting from a corresponding symbol. For example, weighted output 354.1 represents the distortion caused by the non-linear and linear communication channel resulting from the previous symbol, weighted output 354.2 represents the distortion caused by the non-linear and linear communication channel resulting from the second previous symbol, and weighted output 354.k represents the distortion caused by non-linear and linear communication channel resulting from the $k^{th}$ previous symbol. The summation network 102 compensates for the distortion caused by the non-linear and linear communication channel by combining the corresponding weighted outputs 354.1 through 354.k with the received information signal 150 to produce the equalized output 360. The equalized output 360 contains substantially less distortion when compared with the received information signal 150 in the presence of either the linear or non-linear communication channel.

Figure 3B:
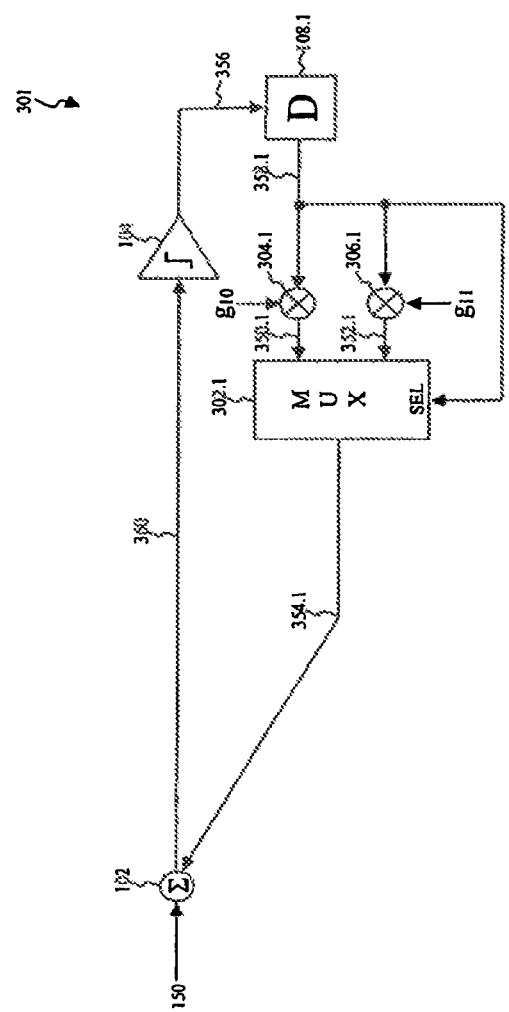
FIG. 3B is an illustration of a block diagram of a single tap non-linear decision feedback equalizer according to another exemplary embodiment of the present invention.

FIG. 3B is an illustration of a block diagram of a single tap non-linear decision feedback equalizer according to another exemplary embodiment of the present invention. Unlike either the linear DFE 100 or the linear DFE 101, the non-linear DFE 301 contains equalization coefficients that are dependent upon whether a previous symbol with the received information signal 150 is a binary zero or a binary one. As a result, the non-linear DFE 301 may compensate for the distortion caused by the linear communication channel and the non-linear communication channel.

The non-linear DFE 301 utilizes the summation network 102, the slicer module 104, the delay module 108.1, the multiplexer 302.1, the multiplier 306.1, and the multiplier 304.1 to compensate for the intersymbol interference impressed upon a corresponding symbol within the received information signal 150 in the presence of either the non-linear or the linear communication channel. As shown in FIG. 3B, the slicer module 104 digitizes the equalized output 360 according to a threshold to produce the slicer output 356.

The delay module 108.1 generates a delayed slicer output 358.1 by delaying the slicer output 356 by the duration of one symbol. In this exemplary embodiment, the non-linear DFE 301 may compensate for distortion caused by the linear communication channel and the non-linear communication channel resulting from the previous symbol by delaying the slicer output 356 by the duration of a single symbol to produce a delayed slicer output 358.1.

The multiplier 304.1 multiplies the equalization coefficient $g_{10}$ with the delayed slicer output 358.1 to generate the binary zero weighted output 350.1. Similarly, the multiplier 306.1 multiplies the equalization coefficient $g_{11}$ with the delayed slicer output 358.1 to generate the binary one weighted output 352.1. Resultant from the asymmetrical properties of the non-linear communication channel, the equalization coefficient $g_{10}$ and the equalization coefficient $g_{11}$ may not be of substantially equal magnitude. In other words, the equalization coefficient $g_{10}$ may differ from the equalization coefficient $g_{11}$.

The multiplexer 302.1 selects between the binary zero weighted output 350.1 and the binary one weighted output 352.1 depending on the value of the delayed slicer output 358.1. For example, if the delayed slicer output 358.1 is assigned a value of binary zero, the multiplexer 302.1 selects the binary zero weighted output 350.1. Likewise, if the delayed slicer output 358.1 is assigned a value of binary one, the multiplexer 302.1 selects the binary one weighted output 352.1.

The weighted output 354.1 represents the amount of distortion caused by the non-linear and the linear communication channel resulting from a previous symbol. The summation network 102 compensates for the distortion caused by the linear and the non-linear communication channel by combining the weighted outputs 354.1 with the received information signal 150 to produce the equalized output 360. The equalized output 360 contains substantially less distortion when compared with the received information signal 150 in the presence of either the linear or non-linear communication channel.

Figure 4A:
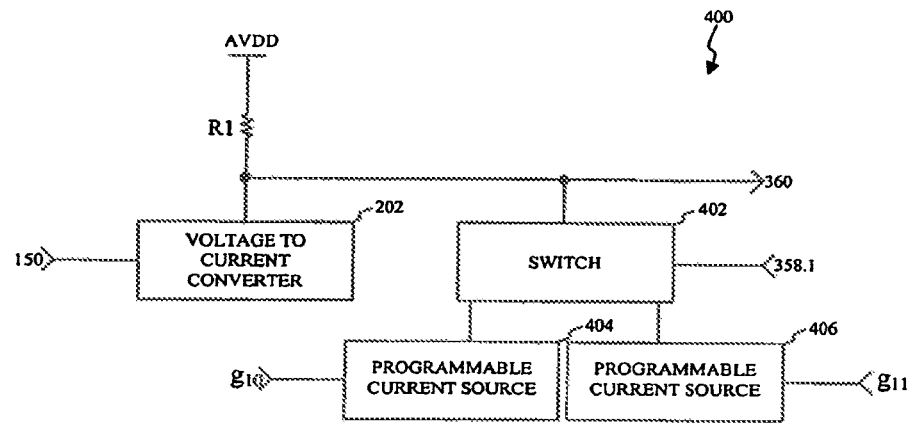
FIG. 4A is an illustration of a block diagram of a current domain implementation of a single tap non-linear decision feedback equalizer according to an exemplary embodiment of the present invention.

FIG. 4A is an illustration of a block diagram of a current domain implementation 400 of a single tap non-linear decision feedback equalizer according to an exemplary embodiment of the present invention. The summation of the received information signal 150 and the weighted output 354 as shown in FIG. 3A and FIG. 3B may occur in the current domain as opposed to the voltage domain. Summation of the received information signal 150 and the weighted output 354 in the current domain allows for greater speed as compared to summing the received information signal 150 and the weighted output 354 in the voltage domain. A voltage to current converter 202 converts the information signal 150 from a voltage to a corresponding current. More specifically, the voltage to current converter 202 allows a current domain representation of the information signal 150 to flow through a resistor R1 to contribute to the equalized output 360. The voltage to current converter 202 may be implemented in the analog domain, the digital domain, or a combination of the analog and digital domains using any suitable means such as a transimpedance amplifier or an operational amplifier to provide some examples.

A programmable current source 404 generates the equalization coefficient $g_{10}$ based upon a digital control word denoted as $g_{10}$ in FIG. 4A. The programmable current source 404 sources a current domain representation of the equalizer coefficient $g_{10}$. Likewise, a programmable current source 406 generates the equalization coefficient $g_{11}$ based upon a digital control word denoted as $g_{11}$ in FIG. 4A. The programmable current source 406 sources a current domain representation of the equalizer coefficient $g_{11}$. In an exemplary embodiment, the equalizer coefficient $g_{10}$ and the equalizer coefficient $g_{11}$ may be implemented using digital codes containing N bits allowing for programmability. The programmable current source 404 converts the digital code representation of the equalizer coefficient $g_{10}$ from a digital signal into an analog current. The magnitude of the analog current is relative to the digital code representation of the equalizer coefficient $g_{10}$. Similarly, the programmable current source 406 converts the digital code representation of the equalizer coefficient $g_{11}$ from a digital signal into an analog current. The magnitude of the analog current is relative to the digital code representation of the equalizer coefficient $g_{11}$.

Depending upon the value of the delayed slicer output 358.1, a switch 402 determines whether the programmable current source 404 sources the current domain representation of the equalizer coefficient $g_{10}$ or the programmable current source 406 sources the current domain representation of the equalizer coefficient $g_{11}$. In other words, the switch 402 either adds the current domain representation of the equalizer coefficient $g_{10}$ to the equalized output 360 or adds the current domain representation of the equalizer coefficient $g_{11}$ to the equalized output 360 depending on the value of the delayed slicer output 358.1. For example, if the delayed slicer output 358.1 represents a binary zero, the switch 402 sources or adds the current domain representation of the equalizer coefficient $g_{10}$ from the equalized output 360. Similarly, if the delayed slicer output 358.1 represents a binary one, the switch 402 sources or adds the current domain representation of the equalizer coefficient $g_{11}$ to the equalized output 360.

The current domain representation of the equalizer coefficient $g_{10}$ from the programmable current source 404 or the current domain representation of the equalizer coefficient $g_{11}$ from the programmable current source 406 combines with a corresponding current domain representation of the received information signal 150 from the voltage to current converter 202 to produce the equalized output 360. For example, if the delayed slicer output 358.1 corresponds to a binary zero, the equalized output 360 corresponds to the combination of the information signal 150 and the current domain representation of the equalizer coefficient $g_{10}$. Similarly, if the delayed slicer output 358.1 corresponds to a binary one, the equalized output 360 corresponds to the combination of the current domain representation of the information signal 150 and the current domain representation of the equalizer coefficient $g_{11}$.

Figure 4B:
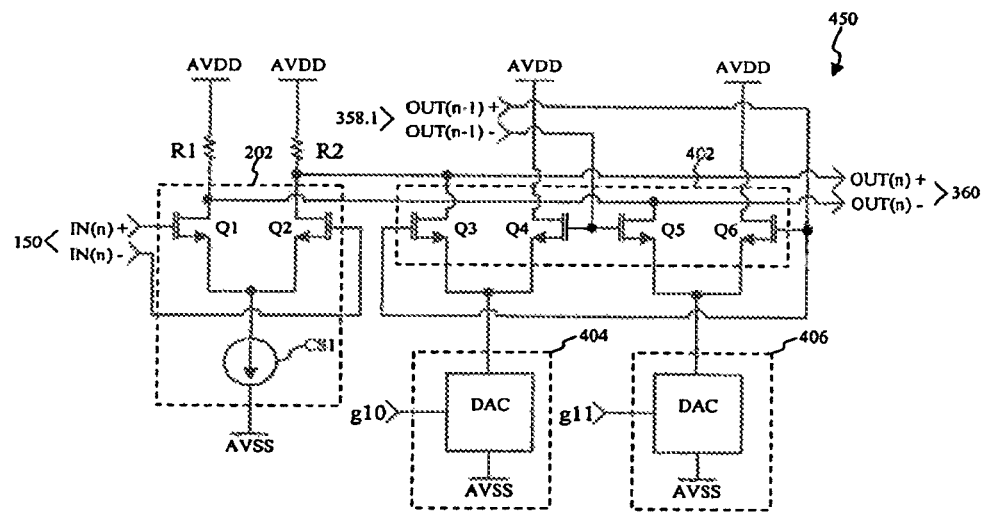
FIG. 4B is an illustration of a transistor level implementation of a current domain implementation of a single tap non-linear decision feedback equalizer according to an exemplary embodiment of the present invention.

FIG. 4B is an illustration of a transistor level implementation 450 of a current domain implementation of a single tap non-linear decision feedback equalizer according to an exemplary embodiment of the present invention. More specifically, FIG. 4B demonstrates an exemplary implementation of the voltage to current converter 202, the switch 402, the programmable current source 404, and the programmable current source 406 as discussed in FIG. 4A using n-type metal oxide semiconductor (NMOS) transistors. In this exemplary embodiment, IN(n)+ and IN(n)− represent a differential implementation of the received information signal 150. Similarly, OUT(n)+ and OUT(n)− represent a differential implementation of the equalized output 360. Likewise, OUT(n−1)+ and OUT(n−1)− represent a differential implementation of the delayed slicer output 358.1.

The voltage to current converter 202 converts the differential signal IN(n)+ and IN(n)− from a representation in the voltage domain to a representation in the current domain using a first differential pair formed by a transistor Q1 and a transistor Q2. The voltage to current converter 202 converts the differential signal IN(n)+ and IN(n)− to a current by outputting a corresponding current that flows through either resistor R1 or resistor R2 based on the differential signal IN(n)+ and IN(n)−. In other words, when the differential signal IN(n)+ is greater than or equal to a threshold voltage of transistor Q1, a current source CS1 sources a current to resistor R1. As a result, a current domain representation of the differential signal IN(n)+ contributes to the differential signal OUT(n)−. Likewise, when the differential signal IN(n)− is greater than or equal to a threshold voltage of transistor Q2, the current source CS1 sources a current to resistor R2. As a result, a current domain representation of the differential signal IN(n)− contributes to the differential signal OUT(n)+.

A programmable current source 404 produces a current domain representation of the equalizer coefficient $g_{10}$ using a digital to analog converter (DAC). More specifically, the digital to analog converter sources a current domain representation of the equalizer coefficient $g_{10}$ to the differential signal OUT(n)+ when the differential signal OUT(n−1)+ is greater than a threshold voltage of transistor Q3. Likewise, a programmable current source 406 produces a current domain representation of the equalizer coefficient $g_{11}$ using a digital to analog converter (DAC). More specifically, the digital to analog converter sources a current domain representation of the equalizer coefficient $g_{11}$ to the differential signal OUT(n)− when the differential signal OUT(n−1)− is greater than a threshold voltage of transistor Q5.

In an exemplary embodiment, the equalizer coefficient $g_{10}$ and/or the equalizer coefficient $g_{11}$ may be implemented using individual digital codes each containing N bits allowing for programmability. The programmable current source 404 converts the digital code representation of the equalizer coefficient $g_{10}$ from a digital signal into a current domain representation of the equalizer coefficient $g_{10}$, while the programmable current source 406 converts the digital code representation of the equalizer coefficient $g_{11}$ from a digital signal into a current domain representation of the equalizer coefficient $g_{11}$. The magnitude of the analog current is relative to either the digital code representation of the equalizer coefficient $g_{10}$ or the digital code representation of the equalizer coefficient $g_{11}$.

The switch 402 determines whether the programmable current source 404 sources a current domain representation of the equalizer coefficient $g_{10}$ to the differential signal OUT(n)+ or the programmable current source 406 sources a current domain representation of the equalizer coefficient $g_{11}$ to the differential signal OUT(n)− using a differential pair formed by a transistor Q3 and a transistor Q4 and another differential pair formed by a transistor Q5 and a transistor Q6. In an exemplary embodiment, the transistor Q3 and the transistor Q4 are matched transistors whose size may be given as $$\frac{N*W}{L},$$

where W represents the width of the transistor, L represents the length of the transistor, and N represents an integer value. Similarly, the transistor Q5 and the transistor Q6 are matched transistors whose size may be given as $$\frac{N*W}{L},$$

where W represents the width of the transistor, L represents the length of the transistor, and N represents an integer value.

The differential pair formed by the transistor Q3 and the transistor Q4 outputs a current domain representation of the equalizer coefficient $g_{10}$ depending on the differential pair OUT(n−1)+ and OUT(n−1)−. When the differential signal OUT(n−1)+ is greater than or equal to a threshold voltage of transistor Q3, the programmable current source 404 sources the current domain representation of the equalizer coefficient $g_{10}$ to the differential signal OUT(n)+. On the other hand, when the differential signal OUT(n−1)− is greater than or equal to a threshold voltage of transistor Q4, the programmable current source 404 connects to AVDD, thereby not allowing the current domain representation of the equalizer coefficient $g_{10}$ to contribute to the differential signal OUT(n)+.

The differential pair formed by the transistor Q5 and the transistor Q6 outputs the current domain representation of the equalizer coefficient $g_{11}$ depending on the differential pair OUT(n−1)+ and OUT(n−1)−. When the differential signal OUT(n−1)− is greater than or equal to a threshold voltage of transistor Q5, the programmable current source 406 sources the current domain representation of the equalizer coefficient $g_{11}$ to the differential signal OUT(n)−. On the other hand, when the differential signal OUT(n−1)+ activates or turns on the transistor Q6, the programmable current source 406 connects to AVDD, thereby not allowing the current domain representation of the equalizer coefficient $g_{11}$ to contribute to the differential signal OUT(n)−.

The current domain representation of either the equalizer coefficient $g_{10}$ from the programmable current source 404 or the equalizer coefficient $g_{11}$ from the programmable current source 406 combines with a corresponding current domain representation of the differential signal IN(n) from the voltage to current converter 202 to produce the differential signal OUT(n). For example, if the delayed slicer output 358.1 corresponds to a binary zero, the differential signal OUT(n−1)+ corresponds to a binary zero and the differential signal OUT(n−1)− corresponds to a binary one. As a result, the differential signal OUT(n)+ includes the current domain representation of the differential signal IN(n), whereas the differential signal OUT(n)− additionally includes the current domain representation of the equalizer coefficient $g_{11}$ from the programmable current source 406. Similarly, if the delayed slicer output 358.1 corresponds to a binary one, the differential signal OUT(n−1)+ corresponds to a binary one and the differential signal OUT(n−1)− corresponds to a binary zero. As a result, the differential signal OUT(n)− includes the current domain representation of the differential signal IN(n), whereas the differential signal OUT(n)+ additionally includes the current domain representation of the equalizer coefficient $g_{10}$ from the programmable current source 404.

Figure 5:
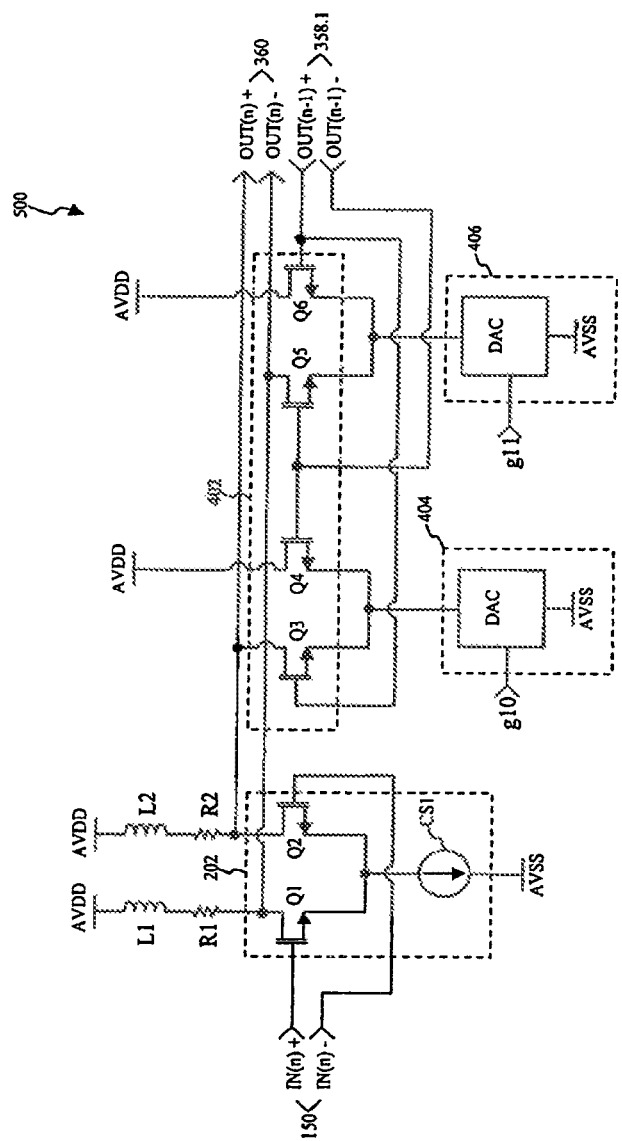
FIG. 5 is an illustration of a transistor level implementation of a current domain implementation of a non-linear decision feedback equalizer using a shunt peaked load according to an exemplary embodiment of the present invention.

FIG. 5 is an illustration of a transistor level implementation 500 of a current domain implementation of a non-linear decision feedback equalizer using a shunt peaked load according to an exemplary embodiment of the present invention. FIG. 5 uses a broadband technique of shunt peaking to increase the bandwidth as compared to the transistor level implementation 450 as discussed in conjunction with FIG. 4B. An inductor L1 between the resistor R1 and AVDD and an inductor L2 between the resistor R2 and AVDD is added to the transistor level implementation 450. Other well-known broadband techniques are available to further increase the bandwidth of the summer and the multiplier shown in FIG. 4 such as a series peaking technique or a Cherry-Hooper technique to provide some examples. The aforementioned techniques may be used in isolation or in conjunction with these or other well known broadband techniques.

Figure 6A:
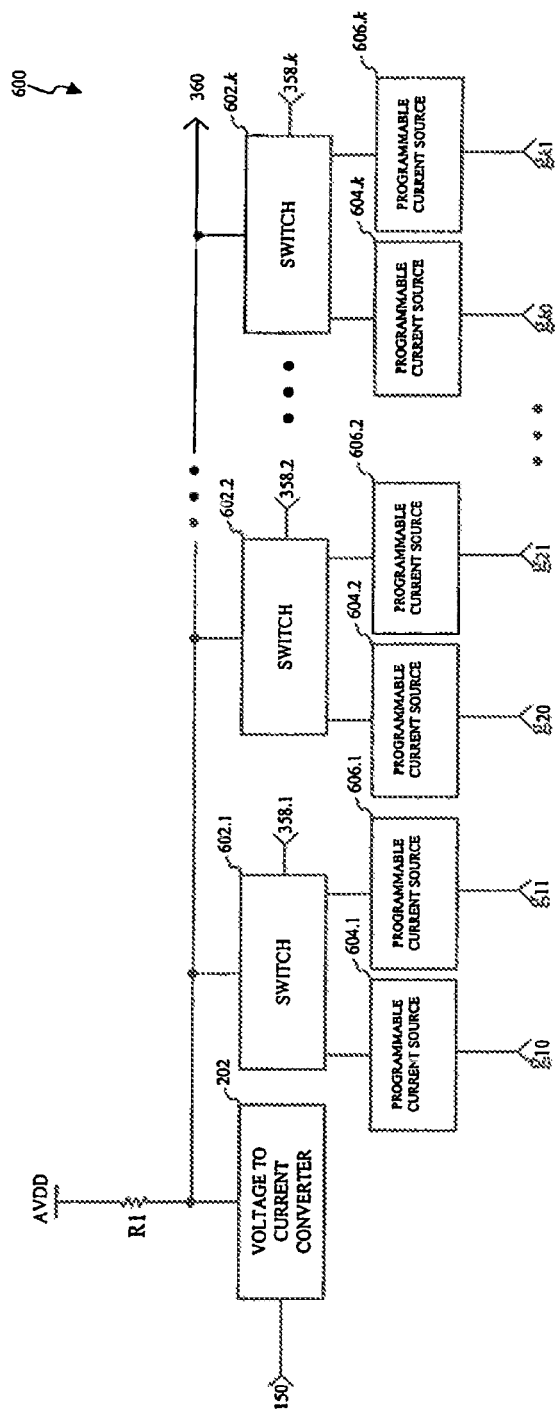
FIG. 6A is an illustration of a block diagram of a current domain implementation of a multi-tap non-linear decision feedback equalizer according to an exemplary embodiment of the present invention.

FIG. 6A is an illustration of a block diagram 600 of a current domain implementation of a multi-tap non-linear decision feedback equalizer according to an exemplary embodiment of the present invention.

The summation of the received information signal 150 and the weighted output 354 may occur in the current domain as opposed to the voltage domain. Summation of the received information signal 150 and the weighted output 354 in the current domain allows for greater speed as compared to summing the received information signal 150 and the weighted output 354 in the voltage domain. A voltage to current converter 202 converts the information signal 150 from a voltage to a corresponding current. More specifically, the voltage to current converter 202 allows a current domain representation of the information signal 150 to flow through a resistor R1 to contribute to the equalized output 360. The voltage to current converter 202 may be implemented in the analog domain, the digital domain, or a combination of the analog and digital domains using any suitable means such as a transimpedance amplifier or an operational amplifier to provide some examples.

A programmable current source 604.1 through 604.$k$ generates a corresponding equalization coefficient $g_{10}$ through $g_{k0}$ based upon a digital control word denoted as $g_{10}$ through $g_{k0}$ in FIG. 6A. A corresponding programmable current source 604 sources a corresponding current domain representation of the equalizer coefficient $g_{10}$ through $g_{k0}$. For example, the programmable current source 604.1 sources the corresponding current domain representation of the equalizer coefficient $g_{10}$. Likewise, the programmable current source 606.1 through 606.$k$ generates a corresponding equalization coefficient $g_{11}$ through $g_{k1}$ based upon a digital control word denoted as $g_{10}$ through $g_{k0}$ in FIG. 6A. A corresponding programmable current source 606 sources a corresponding current domain representation of the equalizer coefficient $g_{11}$ through $g_{k1}$. For example, the programmable current source 606.1 sources the corresponding current domain representation of the equalizer coefficient $g_{11}$. In an exemplary embodiment, the equalizer coefficients $g_{10}$ through $g_{k0}$ and the equalizer coefficients $g_{11}$ through $g_{k1}$ may be implemented using digital codes containing N bits allowing for programmability. The programmable current source 604 converts the digital code representation of a corresponding equalizer coefficients $g_{10}$ through $g_{k0}$ from a digital signal into a corresponding analog current domain representation. The magnitude of the analog current is relative to the digital code representation of the equalizer coefficients $g_{10}$ through $g_{k0}$. Similarly, the programmable current source 606 converts the digital code representation of a corresponding equalizer coefficients $g_{11}$ through $g_{k1}$ from a digital signal into a corresponding analog current domain representation. The magnitude of the analog current is relative to the digital code representation of the equalizer coefficients $g_{11}$ through $g_{k1}$.

Depending upon the value of a corresponding delayed slicer output 358.1 through 358.$k$, a corresponding switch 602.1 through 602.$k$ determines whether a corresponding programmable current source 604.1 through 604.$k$ sources the current domain representation of a corresponding equalizer coefficient $g_{10}$ through $g_{k0}$ or the programmable current source 606 sources the current domain representation of the equalizer coefficient $g_{11}$ through $g_{k1}$. In other words, the corresponding switch 602.1 through 602.$k$ either adds the current domain representation of the corresponding equalizer coefficient $g_{10}$ through $g_{k0}$ to the equalized output 360 or adds the current domain representation of the corresponding equalizer coefficient $g_{11}$ through $g_{k1}$ to the equalized output 360 depending on the value of the corresponding delayed slicer output 358.1 through 358.$k$. For example, if a delayed slicer output 358.1 represents a binary zero, the switch 602.1 sources or adds the current domain representation of the equalizer coefficient $g_{10}$ to the equalized output 360. Likewise, if a delayed slicer output 358.2 represents a binary zero, the switch 602.2 sources or adds the current domain representation of the equalizer coefficient $g_{20}$ from the equalized output 360. On the other hand, if a delayed slicer output 358.1 represents a binary one, the switch 602.1 sources or adds the current domain representation of the equalizer coefficient $g_{11}$ to the equalized output 360. Likewise, if a delayed slicer output 358.2 represents a binary one, the switch 602.2 sources or adds the current domain representation of the equalizer coefficient $g_{21}$ to the equalized output 360.

The current domain representation of the corresponding equalizer coefficient $g_{10}$ through $g_{k0}$ from a corresponding programmable current source 604.1 through 604.$k$ or the corresponding equalizer coefficient $g_{11}$ through $g_{k1}$ from a corresponding programmable current source 606.1 through 606.$k$ combines with a corresponding current domain representation of the received information signal 150 from the voltage to current converter 202 to produce the equalized output 360. For example, if the delayed slicer output 358.1 corresponds to a binary zero, the current domain representation of the equalizer coefficient $g_{10}$ is combined to the equalized output 360. Similarly, if the delayed slicer output 358.2 corresponds to a binary zero, the current domain representation of the equalizer coefficient $g_{20}$ is combined to the equalized output 360. On the other hand, when the delayed slicer output 358.1 corresponds to a binary one, the current domain representation of the equalizer coefficient $g_{11}$ is combined to the equalized output 360. Similarly, if the delayed slicer output 358.2 corresponds to a binary one, the current domain representation of the equalizer coefficient $g_{21}$ is combined to the equalized output 360.

Figure 6B:
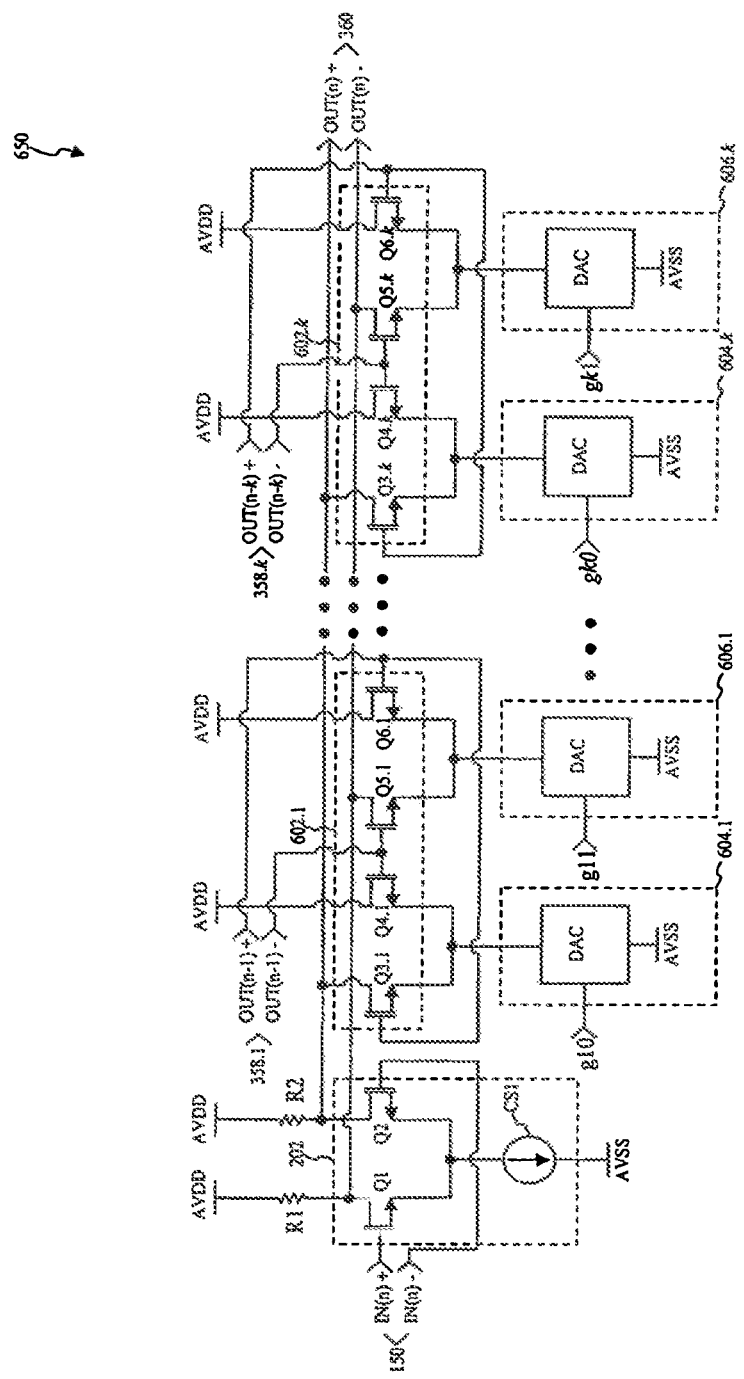
FIG. 6B is an illustration of a transistor level implementation of a current domain implementation of a multi-tap non-linear decision feedback equalizer according to an exemplary embodiment of the present invention.

FIG. 6B is an illustration of a transistor level implementation 650 of a current domain implementation of a multi-tap non-linear decision feedback equalizer according to an exemplary embodiment of the present invention. More specifically, FIG. 6B demonstrates an exemplary implementation of the voltage to current converter 202, the switch 602.1 through 602.$k$, the programmable current source 604.1 through 604.$k$, and the programmable current source 606.1 through 606.$k$ as discussed in FIG. 6A using n-type metal oxide semiconductor (NMOS) transistors. In this exemplary embodiment, IN(n)+ and IN(n)− represent a differential implementation of the received information signal 150. Similarly, OUT(n)+ and OUT(n)− represent a differential implementation of the equalized output 360. Likewise, OUT(n−1)+ and OUT(n−1)− represent a differential implementation of the delayed slicer output 358.1, and OUT(n−k)+ and OUT(n−k)− represent a differential implementation of the delayed slicer output 358.$k$.

The voltage to current converter 202 converts the differential signal IN(n)+ and IN(n)− from a representation in the voltage domain to a representation in the current domain using a first differential pair formed by a transistor Q1 and a transistor Q2. The voltage to current converter 202 converts the differential signal IN(n)+ and IN(n)− to a current by outputting a corresponding current that flows through either resistor R1 or resistor R2 based on the differential signal IN(n)+ and IN(n)−. In other words, when the differential signal IN(n)+ is greater than or equal to a threshold voltage of transistor Q1, a current source CS1 sources a current to resistor R1. As a result, a current domain representation of the differential signal IN(n)+ contributes to the differential signal OUT(n)−. Likewise, when the differential signal IN(n)− is greater than or equal to a threshold voltage of transistor Q2, the current source CS 1 sources a current to resistor R2. As a result, a current domain representation of the differential signal IN(n)− contributes to the differential signal OUT(n)+.

A corresponding programmable current source 604.1 through 604.$k$ produces a current domain representation of a corresponding equalizer coefficient $g_{10}$ through $g_{k0}$ using a digital to analog converter (DAC). More specifically, the digital to analog converter sources a current domain representation of the corresponding equalizer coefficient $g_{10}$ through $g_{k0}$ to the differential signal OUT(n)+ when a corresponding differential signal OUT(n−1)+ through OUT(n−k)+ represents a binary one. For example, the digital to analog converter sources a current domain representation of the corresponding equalizer coefficient $g_{10}$ to the differential signal OUT(n)+ when the differential signal OUT(n−1)+ represents a binary one. Likewise, a corresponding programmable current source 606.1 through 606.$k$ produces a current domain representation of a corresponding equalizer coefficient $g_{11}$ through $g_{k1}$ using a digital to analog converter (DAC). More specifically, the digital to analog converter sources a current domain representation of the corresponding equalizer coefficient $g_{10}$ through $g_{k0}$ to the differential signal OUT(n)− when a corresponding differential signal OUT(n−1)− through OUT(n−k)− represents a binary one. For example, the digital to analog converter sources a current domain representation of the corresponding equalizer coefficient $g_{10}$ to the differential signal OUT(n)− when the differential signal OUT(n−1)− represents a binary one.

In an exemplary embodiment, the equalizer coefficients $g_{10}$ through $g_{k0}$ and/or the equalizer coefficients $g_{11}$ through $g_{k1}$ may be implemented using individual digital codes each containing N bits allowing for programmability. A corresponding programmable current source 604.1 through 604.$k$ converts the digital code representation of the corresponding equalizer coefficient $g_{10}$ through $g_{k0}$ from a digital signal into a corresponding current domain representation, while the programmable current source 606.1 through 606.$k$ converts the digital code representation of the corresponding equalizer coefficient $g_{11}$ through $g_{k1}$ equalizer coefficient $g_{11}$ from a digital signal into a corresponding current domain representation. The magnitude of the analog current is relative to the digital code representation of the corresponding equalizer coefficient $g_{10}$ through $g_{k0}$ or the digital code representation of the corresponding equalizer coefficient $g_{11}$ through $g_{k1}$.

A corresponding switch 602.1 through 602.$k$ determines whether a corresponding programmable current source 604.1 through 604.$k$ sources a current domain representation of the corresponding equalizer coefficient $g_{10}$ through $g_{k0}$ to the differential signal OUT(n)+ or a corresponding programmable current source 606.1 through 606.$k$ sources a current domain representation of the corresponding equalizer coefficient $g_{11}$ through $g_{k1}$ to the differential signal OUT(n)− using a corresponding differential pair formed by a transistor Q3 and a transistor Q4 and another corresponding differential pair formed by a transistor Q5 and a transistor Q6. For example, the switch 602.1 determines whether the programmable current source 604.1 sources a current domain representation of the equalizer coefficient $g_{10}$ to the differential signal OUT(n)+ or the programmable current source 606.1 sources a current domain representation of the equalizer coefficient $g_{11}$ to the differential signal OUT(n)− using a differential pair formed by a transistor Q3.1 and a transistor Q4.1 and another differential pair formed by a transistor Q5.1 and a transistor Q6.1. Likewise, the switch 602.$k$ determines whether the programmable current source 604.$k$ sources a current domain representation of the equalizer coefficient $g_{k0}$ to the differential signal OUT(n)+ or the programmable current source 606.$k$ sources a current domain representation of the corresponding equalizer coefficient $g_{k1}$ to the differential signal OUT(n)− using a corresponding differential pair formed by a transistor Q3.$k$ and a transistor Q4.$k$ and another corresponding differential pair formed by a transistor Q5.$k$ and a transistor Q6.$k$. In an exemplary embodiment, the transistors Q3.1 through Q3.$k$ and the transistors Q4.1 through Q4.$k$ are matched transistors whose size may be given as $$\frac{N*W}{L},$$

where W represents the width of the transistor, L represents the length of the transistor, and N represents an integer value. Similarly, the transistors Q5.1 through Q5.$k$ and the transistors Q6.1 through Q6.$k$ are matched transistors whose size may be given as $$\frac{N*W}{L},$$

where W represents the width of the transistor, L represents the length of the transistor, and N represents an integer value.

The differential pair formed by the corresponding transistor Q3.1 through Q3.$k$ and the corresponding transistor Q4.1 through Q4.$k$ outputs the current domain representation of the corresponding equalizer coefficient $g_{10}$ through $g_{k0}$ depending on the differential pairs OUT(n−1)+ through OUT(n−k)+ and OUT(n−1)− through OUT(n−k)−. When a corresponding differential signal OUT(n−1)+ through OUT(n−k)+ is greater than or equal to a threshold voltage of the corresponding transistor Q3.1 through Q3.$k$, the corresponding programmable current source 604.1 through 604.$k$ sources the current domain representation of the corresponding equalizer coefficient $g_{10}$ through $g_{k0}$ to the differential signal OUT(n)+. For example, if the differential signal OUT(n-1)+ is greater than or equal to a threshold voltage of transistor Q3.1, the programmable current source 604.1 sources the current domain representation of the equalizer coefficient $g_{10}$ to the differential signal OUT(n)+. Similarly, if the differential signal OUT(n-k)+ is greater than or equal to a threshold voltage of transistor Q3.$k$, the programmable current source 604.$k$ sources the current domain representation of the equalizer coefficient $g_{k0}$ to the differential signal OUT(n)+. On the other hand, when the corresponding differential signal OUT(n−1)− through OUT(n−k)− is greater than or equal to a threshold voltage of a corresponding transistor Q4.1 through Q4.$k$, the corresponding programmable current source 606.1 through 606.$k$ connects to AVDD, thereby not allowing the current domain representation of the corresponding equalizer coefficient $g_{10}$ through $g_{k0}$ to contribute to the differential signal OUT(n)+.

The differential pair formed by the corresponding transistor Q5.1 through Q5.$k$ and the corresponding transistor Q6.1 through Q6.$k$ outputs the current domain representation of the corresponding equalizer coefficient $g_{11}$ through $g_{k1}$ depending on the differential pairs OUT(n−1)+ through OUT(n-k)+ and OUT(n−1)− through OUT(n-k)−. When a corresponding differential signal OUT(n−1)− through OUT(n-k)− is greater than or equal to a threshold voltage of the corresponding transistor Q5.1 through Q5.$k$, the corresponding programmable current source 606.1 through 606.$k$ sources the current domain representation of the corresponding equalizer coefficient $g_{11}$ through $g_{k1}$ to the differential signal OUT(n)−. For example, if the differential signal OUT(n−1)− is greater than or equal to a threshold voltage of transistor Q5.1, the programmable current source 606.1 sources the current domain representation of the equalizer coefficient $g_{11}$ to the differential signal OUT(n)−. Similarly, if the differential signal OUT(n-k)− is greater than or equal to a threshold voltage of transistor Q5.$k$, the programmable current source 606.$k$ sources the current domain representation of the equalizer coefficient $g_{k1}$ to the differential signal OUT(n)−. On the other hand, when the corresponding differential signal OUT(n−1)+ through OUT(n-k)+ is greater than or equal to a threshold voltage of the corresponding transistor Q6.1 through Q6.$k$, the corresponding programmable current source 606.1 through 606.$k$ connects to AVDD, thereby not allowing the current domain representation of the corresponding equalizer coefficient $g_{11}$ through $g_{k1}$ to contribute to the differential signal OUT(n)−.

The corresponding current domain representation of either the corresponding equalizer coefficient $g_{10}$ through $g_{k0}$ from the corresponding programmable current source 604.1 through 604.$k$ or the corresponding equalizer coefficient $g_{11}$ through $g_{k1}$ from the corresponding programmable current source 606.1 through 606.$k$ combines with a corresponding current domain representation of the differential signal IN(n) from the voltage to current converter 202 to produce the differential signal OUT(n). For example, if a corresponding delayed slicer output 358.1 through 358.$k$ corresponds to a binary zero, the corresponding differential signal OUT(n−1)+ through OUT(n-k)+ represents a binary zero and the corresponding differential signal OUT(n-1)− through OUT(n-k)− represents a binary one. As a result, the differential signal OUT(n)+ includes the current domain representation of the differential signal IN(n), whereas the differential signal OUT(n)− additionally includes the current domain representation of the corresponding equalizer coefficient $g_{11}$ through $g_{k1}$ from the corresponding programmable current source 606.1 through 606.$k$. Similarly, if a corresponding delayed slicer output 358.1 through 358.$k$ corresponds to a binary one, the corresponding differential signal OUT(n−1)+ through OUT(n-k)+ represents a binary one and the corresponding differential signal OUT(n-1)− through OUT(n-k)− represents a binary zero. As a result, the differential signal OUT(n)− includes the current domain representation of the differential signal IN(n), whereas the differential signal OUT(n)+ additionally includes the current domain representation of the corresponding equalizer coefficient $g_{10}$ through $g_{k0}$ from the corresponding programmable current source 604.1 through 604.$k$.

Recalling from the discussion of FIG. 2B, the transistor level implementation 250 of the current domain implementation of the single tap linear decision feedback equalizer utilizes the differential pair formed by the transistor Q3 and the transistor Q4. On the other hand, the transistor level implementation 450 of the current domain implementation of the single tap non-linear decision feedback equalizer utilizes the differential pair formed by the transistor Q5 and the transistor Q6 in addition to the differential pair formed by the transistor Q3 and the transistor Q4. As a result of the differential pair formed by the transistor Q5 and the transistor Q6, the transistor level implementation 450 of the current domain implementation of the single tap non-linear decision feedback equalizer is larger in area, has a greater residual capacitance, and has a larger current consumption when compared to the transistor level implementation 250 of the current domain implementation of the single tap linear decision feedback equalizer. To reduce the area, the residual capacitance, and the current consumption of the transistor level implementation 450 of the current domain implementation of the single tap non-linear decision feedback equalizer, an exemplary embodiment employs a principle of DAC sharing.

As shown in FIG. 3B, the non-linear DFE 301 compensates for distortion caused by a non-linear communication channel by selecting or multiplexing between equalizer coefficients $g_{10}$ and $g_{11}$. The equalizer coefficient $g_{11}$ maybe expressed in the form $g_c + g_{d,1}$, whereas the equalizer coefficient $g_{10}$ maybe expressed in the form $g_c + g_{d,0}$. The common equalizer coefficient $g_c$ represents a symmetrical or common value between the equalizer coefficients $g_{10}$ and $g_{11}$ regardless of the delayed slicer output 358.1. The common equalizer coefficient $g_c$ may be expressed using a statistical relationship between the equalizer coefficients $g_{10}$ and $g_{11}$ such as the mean or the median to provide some examples. The differential equalizer coefficients $g_{d,0}$ and $g_{d,1}$ represent the difference between the equalizer coefficients $g_{10}$ and $g_{11}$ and the common equalizer coefficient $g_c$. By separating the equalizer coefficients $g_{10}$ and $g_{11}$ into a common equalizer coefficient $g_c$ and a corresponding differential equalizer coefficient $g_{d,0}$ and $g_{d,1}$ a single shared DAC may be used to generate a significant portion of the equalizer coefficients $g_{10}$ and $g_{11}$ thereby reducing the area, the residual capacitance, and the current consumption.

Figure 7A:
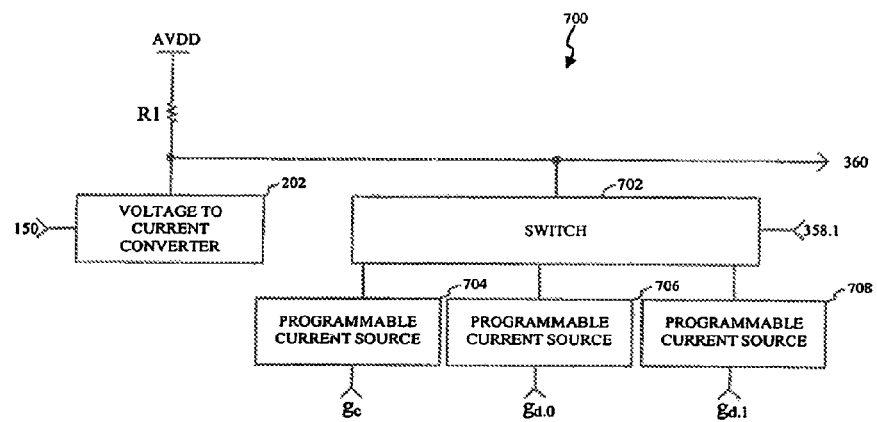
FIG. 7A is an illustration of a block diagram of a current domain implementation of a multi-tap non-linear decision feedback equalizer with digital to analog converter sharing according to an exemplary embodiment of the present invention.

FIG. 7A is an illustration of a block diagram 700 of a current domain implementation of a multi-tap non-linear decision feedback equalizer with digital to analog converter sharing according to an exemplary embodiment of the present invention. The summation of the received information signal 150 and the weighted output 354 as shown in FIG. 3A and FIG. 3B may occur in the current domain as opposed to the voltage domain. Summation of the received information signal 150 and the weighted output 354 in the current domain allows for greater speed as compared to summing the received information signal 150 and the weighted output 354 in the voltage domain. A voltage to current converter 202 converts the information signal 150 from a voltage to a corresponding current. More specifically, the voltage to current converter 202 allows a current domain representation of the information signal 150 to flow through a resistor R1 to contribute to the equalized output 360. The voltage to current converter 202 may be implemented in the analog domain, the digital domain, or a combination of the analog and digital domains using any suitable means such as a transimpedance amplifier or an operational amplifier to provide some examples.

A programmable current source 704, such as a digital to analog converter (DAC), generates the common equalization coefficient $g_c$ based upon a digital control word denoted as $g_c$ in FIG. 7A. The programmable current source 704 sources a current domain representation of the common equalization coefficient $g_c$. Likewise, a programmable current source 706, such as a digital to analog converter (DAC), generates the differential equalization coefficient $g_{d,0}$ based upon a digital control word denoted as $g_{d,0}$ in FIG. 7A. The programmable current source 706 sources a current domain representation of the equalizer coefficient $g_{d,0}$. Similarly, a programmable current source 708, such as a digital to analog converter (DAC), generates the differential equalization coefficient $g_{d,1}$ based upon a digital control word denoted as $g_{d,1}$ in FIG. 7A. The programmable current source 708 sources a current domain representation of the equalizer coefficient $g_{d,1}$. In an exemplary embodiment, the common equalizer coefficient $g_c$, the differential equalization coefficient $g_{d,0}$ and the differential equalization coefficient $g_{d,1}$ may be implemented using digital codes containing N bits allowing for programmability.

The programmable current source 704 converts the digital code representation of the common equalizer coefficient $g_c$ from a digital signal into an analog current. The magnitude of the analog current is relative to the digital code representation of the common equalizer coefficient $g_c$. Similarly, the programmable current source 706 converts the digital code representation of generates the differential equalization coefficient $g_{d,0}$ from a digital signal into an analog current. The magnitude of the analog current is relative to the digital code representation of the differential equalization coefficient $g_{d,0}$. Likewise, the programmable current source 708 converts the digital code representation of generates the differential equalization coefficient $g_{d,1}$ from a digital signal into an analog current. The magnitude of the analog current is relative to the digital code representation of the differential equalization coefficient $g_{d,1}$.

Depending upon the value of the delayed slicer output 358.1, a switch 702 determines whether the programmable current source 704 sources or sinks the current domain representation of the common equalizer coefficient $g_c$, the programmable current source 706 sources the current domain representation of the differential equalization coefficient $g_{d,0}$ or the programmable current source 708 sources the current domain representation of the differential equalization coefficient $g_{d,1}$. In other words, the switch 702 either adds the current domain representation of the common equalizer coefficient $g_c$ to the equalized output 360 or subtracts the current domain representation of the common equalizer coefficient $g_c$ from the equalized output 360 depending on the value of the delayed slicer output 358.1. For example, if the delayed slicer output 358.1 represents a binary zero, the switch 702 sinks or subtracts the current domain representation of the common equalizer coefficient $g_c$ from the equalized output 360. Similarly, if the delayed slicer output 358.1 represents a binary one, the switch 702 sources or adds the current domain representation of the common equalizer coefficient $g_c$ to the equalized output 360. Likewise, the switch 702 either adds the current domain representation of the differential equalization coefficient $g_{d,0}$ to the equalized output 360 or adds the current domain representation of the differential equalization coefficient $g_{d,1}$ to the equalized output 360 depending on the value of the delayed slicer output 358.1. For example, if the delayed slicer output 358.1 represents a binary zero, the switch 702 sources or adds the current domain representation of the differential equalization coefficient $g_{d,0}$ to the equalized output 360. Similarly, if the delayed slicer output 358.1 represents a binary one, the switch 702 sources or adds the current domain representation of the differential equalization coefficient $g_{d,1}$ to the equalized output 360.

The current domain representation of the common equalizer coefficient $g_c$ from the programmable current source 704 combines with a corresponding current domain representation of the received information signal 150 from the voltage to current converter 202 to produce the common component of the equalized output 360. For example, if the delayed slicer output 358.1 corresponds to a binary zero, the common component equalized output 360 corresponds to the difference between the current domain representation of the information signal 150 and the current domain representation of the common equalizer coefficient $g_c$. Similarly, if the delayed slicer output 358.1 corresponds to a binary one, the common component equalized output 360 corresponds to the combination of the current domain representation of the information signal 150 and the current domain representation of the common equalizer coefficient $g_c$. Likewise, the current domain representation of the differential equalization coefficient $g_{d,0}$ from the programmable current source 706 or the current domain representation of the differential equalization coefficient $g_{d,1}$ from the programmable current source 708 produces the differential component of the equalized output 360. For example, if the delayed slicer output 358.1 corresponds to a binary zero, the differential component of the equalized output 360 corresponds to the current domain representation of the differential equalization coefficient $g_{d,0}$. Similarly, if the delayed slicer output 358.1 corresponds to a binary one, the differential component of the equalized output 360 corresponds to the current domain representation of the differential equalization coefficient $g_{d,1}$.

Figure 7B:
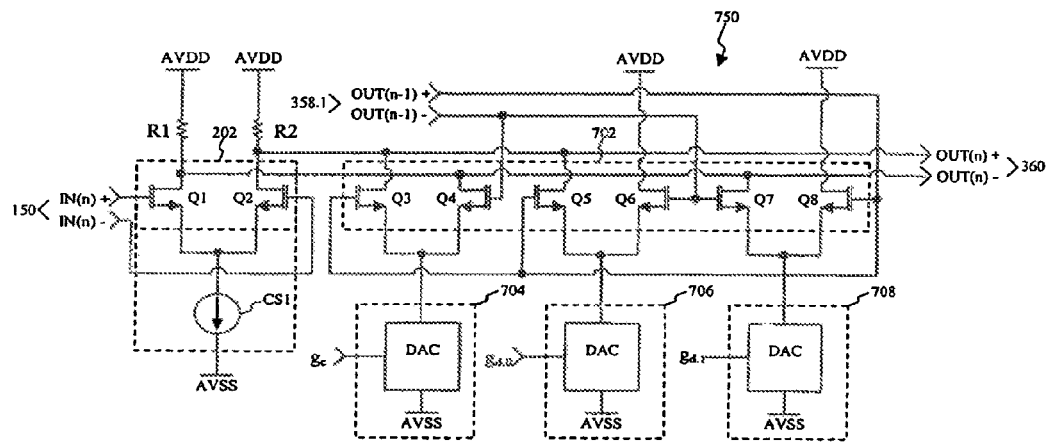
FIG. 7B is an illustration of a transistor level implementation of a current domain implementation of a single tap non-linear decision feedback equalizer with digital to analog converter sharing according to an exemplary embodiment of the present invention.

FIG. 7B is an illustration of a transistor level implementation 750 of a current domain implementation of a single tap non-linear decision feedback equalizer with digital to analog converter sharing according to an exemplary embodiment of the present invention. More specifically, FIG. 7B demonstrates an exemplary implementation of the voltage to current converter 202, the switch 702, the programmable current source 704, the programmable current source 706, and the programmable current source 708 as discussed in FIG. 7A using n-type metal oxide semiconductor (NMOS) transistors. In this exemplary embodiment, IN(n)+ and IN(n)− represent a differential implementation of the received information signal 150. Similarly, OUT(n)+ and OUT(n)− represent a differential implementation of the equalized output 360. Likewise, OUT(n−1)+ and OUT(n−1)− represent a differential implementation of the delayed slicer output 358.1.

The voltage to current converter 202 converts the differential signal IN(n)+ and IN(n)− from a representation in the voltage domain to a representation in the current domain using a first differential pair formed by a transistor Q1 and a transistor Q2. The voltage to current converter 202 converts the differential signal IN(n)+ and IN(n)− to a current by outputting a corresponding current that flows through either resistor R1 or resistor R2 based on the differential signal IN(n)+ and IN(n)−. In other words, when the differential signal IN(n)+ is greater than or equal to a threshold voltage of transistor Q1, a current source CS1 sources a current to resistor R1. As a result, a current domain representation of the differential signal IN(n)+ contributes to the differential signal OUT(n)−. Likewise, when the differential signal IN(n)− is greater than or equal to a threshold voltage of transistor Q2, the current source CS1 sources a current to resistor R2. As a result, a current domain representation of the differential signal IN(n)− contributes to the differential signal OUT(n)+.

A programmable current source 704 produces a current domain representation of the common equalizer coefficient $g_c$ using a digital to analog converter (DAC). More specifically, the digital to analog converter sources the current domain representation of common equalizer coefficient $g_c$ to the differential signal OUT(n)+ when the differential signal OUT(n−1)+ represents a binary one and sinks the current domain representation of common equalizer coefficient $g_c$ from the differential signal OUT(n)− when the differential signal OUT(n−1)− represents a binary one. Likewise, a programmable current source 706 produces a current domain representation of the differential equalization coefficient $g_{d,0}$ using a digital to analog converter (DAC). More specifically, the digital to analog converter sources a current domain representation of the differential equalization coefficient $g_{d,0}$ to the differential signal OUT(n)+ when the differential signal OUT(n−1)+ represents a binary one. Similarly, a programmable current source 708 produces a current domain representation of the differential equalization coefficient $g_{d,1}$ using a digital to analog converter (DAC). More specifically, the digital to analog converter sources a current domain representation of the differential equalization coefficient $g_{d,1}$ to the differential signal OUT(n)− when the differential signal OUT(n−1)− represents a binary one.

In an exemplary embodiment, the common equalizer coefficient $g_c$, the differential equalization coefficient $g_{d,0}$ and/or the differential equalization coefficient $g_{d,1}$ may be implemented using individual digital codes each containing N bits allowing for programmability. The programmable current source 704 converts the digital code representation of the common equalizer coefficient $g_c$ from a digital signal into a current domain representation of the equalizer the common equalizer coefficient $g_c$, the programmable current source 706 converts the digital code representation of the differential equalization coefficient $g_{d,0}$ from a digital signal into a current domain representation of the differential equalization coefficient $g_{d,0}$, while the programmable current source 708 converts the digital code representation of the differential equalization coefficient $g_{d,1}$ from a digital signal into a current domain representation of the differential equalization coefficient $g_{d,1}$. The magnitude of the analog current is relative to either the digital code representation of the common equalizer coefficient $g_c$, the digital code representation of the differential equalization coefficient $g_{d,1}$, or the digital code representation of the differential equalization coefficient $g_{d,1}$.

The switch 702 determines whether the programmable current source 704 sources a current domain representation of the common equalizer coefficient $g_c$ to either the differential signal OUT(n)+ or the differential signal OUT(n)− using a differential pair formed by a transistor Q3 and a transistor Q4. In an exemplary embodiment, the transistor Q3 and the transistor Q4 are matched transistors whose size may be given as $$\frac{N_C * W}{L},$$

where W represents the width of the transistor, L represents the length of the transistor, and $N_C$ represents an integer value. In an exemplary embodiment, the integer $N_C$ of the transistor Q3 and the transistor Q4 of FIG. 7B is substantially less than the integer N of the transistor Q3 and the transistor Q4 of FIG. 2B, FIG. 4B, or FIG. 5. When the differential signal OUT(n−1)+ is greater than or equal to a threshold voltage of transistor Q3, the programmable current source 704 sources a current domain representation of the common equalizer coefficient $g_c$ to the differential signal OUT(n)+. Likewise, when the differential signal OUT(n−1)− is greater than or equal to a threshold voltage of transistor Q4, the programmable current source 704 sources a current domain representation of the common equalizer coefficient $g_c$ to the differential signal OUT(n)−.

The switch 702 further determines whether the programmable current source 706 sources a current domain representation of the differential equalization coefficient $g_{d,0}$ to the differential signal OUT(n)+ or the programmable current source 708 sources a current domain representation of the differential equalization coefficient $g_{d,1}$ to the differential signal OUT(n)− using a differential pair formed by a transistor Q5 and a transistor Q6 and another differential pair formed by a transistor Q7 and a transistor Q8. In an exemplary embodiment, the transistor Q5, the transistor Q6, the transistor Q7, and the transistor Q8 are matched transistors whose size may be given as $$\frac{N_D * W}{L},$$

where W represents the width of the transistor, L represents the length of the transistor, and $N_D$ represents an integer value. In this exemplary embodiment, the integer $N_D$ of the transistor Q5, the transistor Q6, the transistor Q7, and the transistor Q8 of FIG. 7B is substantially less than the integer $N_C$ of the transistor Q3 and the transistor Q4. In another exemplary embodiment, the integer $N_D$ of the transistor Q5, the transistor Q6, the transistor Q7, and the transistor Q8 of FIG. 7B may be given as the difference between the integer N of the transistor Q3 and the transistor Q4 of FIG. 2B, FIG. 4B, or FIG. 5 and the integer $N_C$ of the transistor Q3 and the transistor Q4.

The differential pair formed by the transistor Q5 and the transistor Q6 outputs the current domain representation of the differential equalization coefficient $g_{d,0}$ depending on the differential pair OUT(n−1)+ and OUT(n−1)−. When the differential signal OUT(n−1)+ is greater than or equal to a threshold voltage of transistor Q5, the programmable current source 706 sources the current domain representation of the differential equalization coefficient $g_{d,0}$ to the differential signal OUT(n)+. On the other hand, when the differential signal OUT(n−1)− activates or turns on the transistor Q6, the programmable current source 706 connects to AVDD, thereby not allowing the current domain representation of the differential equalization coefficient $g_{d,0}$ to contribute to the differential signal OUT(n)+.

The differential pair formed by the transistor Q7 and the transistor Q8 outputs the current domain representation of the equalizer coefficient $g_{d,1}$ depending on the differential pair OUT(n−1)+ and OUT(n−1)−. When the differential signal OUT(n−1)− is greater than or equal to a threshold voltage of transistor Q7, the programmable current source 708 sources the current domain representation of the differential equalization coefficient $g_{d,1}$ to the differential signal OUT(n)−. On the other hand, when the differential signal OUT(n−1)+ is greater than or equal to a threshold voltage of transistor Q8, the programmable current source 708 connects to AVDD, thereby not allowing the current domain representation of the differential equalization coefficient $g_{d,1}$ to contribute to the differential signal OUT(n)−.

The current domain representation of the common equalizer coefficient $g_c$ from the programmable current source 704 combines with a corresponding current domain representation of the received information signal 150 from the voltage to current converter 202 to produce the common component of the equalized output 360. For example, if the delayed slicer output 358.1 corresponds to a binary zero, the common component equalized output 360 corresponds to the difference between the current domain representation of the information signal 150 and the current domain representation of the common equalizer coefficient $g_c$. Similarly, if the delayed slicer output 358.1 corresponds to a binary one, the common component equalized output 360 corresponds to the combination of the current domain representation of the information signal 150 and the current domain representation of the common equalizer coefficient $g_c$. Likewise, the current domain representation of the differential equalization coefficient $g_{d.0}$ from the programmable current source 706 or the current domain representation of the differential equalization coefficient $g_{d.1}$ from the programmable current source 708 produces the differential component of the equalized output 360. For example, if the delayed slicer output 358.1 corresponds to a binary zero, the differential component of the equalized output 360 corresponds to the current domain representation of the differential equalization coefficient $g_{d.0}$. Similarly, if the delayed slicer output 358.1 corresponds to a binary one, the differential component of the equalized output 360 corresponds to the current domain representation of the differential equalization coefficient $g_{d.1}$.

The transistor level implementation 750 of a current domain implementation of a single tap non-linear decision feedback equalizer with digital to analog converter sharing has a reduction in area, residual capacitance, and current consumption when compared to the transistor level implementation 450 of a current domain implementation of a single tap non-linear decision feedback equalizer. For example, the differential pair formed by the transistor Q3 and the transistor Q4 and the differential pair formed by the transistor Q5 and the transistor Q6 as shown in FIG. 4B includes the transistor Q3, transistor Q4, transistor Q5, and transistor Q6 through Q6 each with a size of $$\frac{N*W}{L}$$

for a total area of at least $$4*\frac{N*W}{L}.$$

On the other hand, the differential pair formed by the transistor Q3 and the transistor Q4, the differential pair formed by the transistor Q5 and the transistor Q6, and the differential pair formed by the transistor Q7 and the transistor Q8 of FIG. 7B includes transistor Q3 and transistor Q4 each with a size of $$\frac{N_C*W}{L}$$

and the transistor Q5, the transistor Q6, the transistor Q7, and the transistor Q8 each with a size of $$\frac{N_D*W}{L}$$

for a total area of at least $$\left(2*\frac{N_C*W}{L}+4*\frac{N_D*W}{L}\right).$$

As an example, recalling the exemplary embodiment presented above where the integer N is given by $N=N_C+N_D$, the transistor level implementation 750 of a current domain implementation of a single tap non-linear decision feedback equalizer with digital to analog converter sharing reduces the required area by at least $$2*\frac{N_C*W}{L}.$$

A further reduction in area, residual capacitance, and current consumption may be achieved by selecting the common equalizer coefficient $g_c$ to equal either the equalizer coefficient $g_{10}$ or the equalizer coefficient $g_{11}$. Selecting the equalizer coefficients $g_c$ in this manner allows for the elimination of either the differential pair formed by the transistor Q5 and the transistor Q6 or the differential pair formed by the transistor Q7 and the transistor Q8.

Figure 8A:
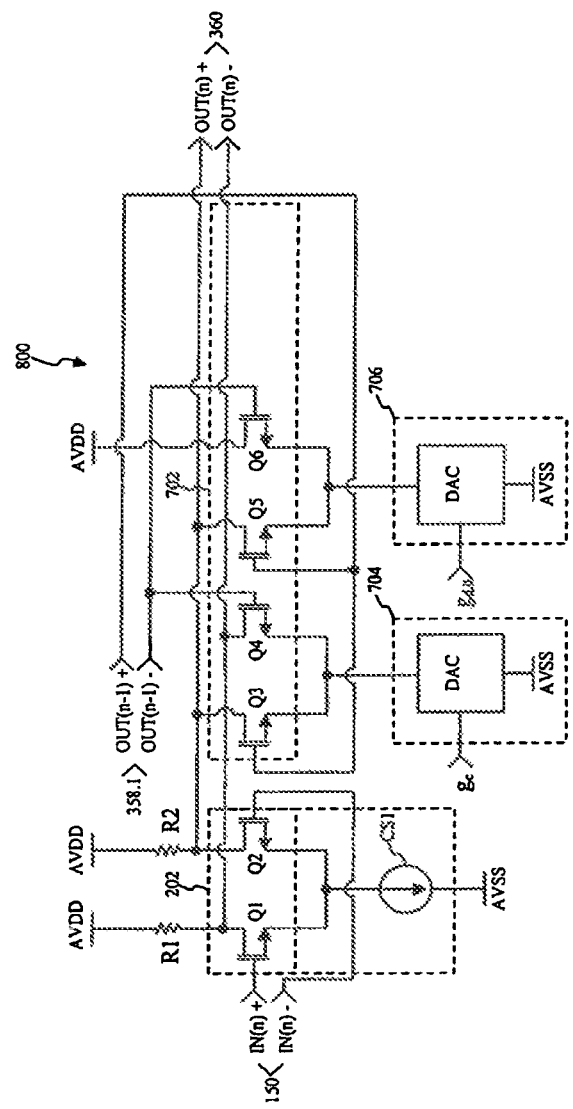
FIG. 8A is an illustration of a transistor level implementation of a current domain implementation of a single tap non-linear decision feedback equalizer with digital to analog converter sharing according to another exemplary embodiment of the present invention.

FIG. 8A is an illustration of a transistor level implementation 800 of a current domain implementation of a single tap non-linear decision feedback equalizer with digital to analog converter sharing according to another exemplary embodiment of the present invention. In this exemplary embodiment, the equalizer coefficient $g_c$ is chosen to equal the equalizer coefficient $g_{11}$ allowing for generation of the equalizer coefficient $g_{10}$ by adding the common equalizer coefficient $g_c$ with the differential equalization coefficient $g_{d.0}$. In other words, by choosing the equalizer coefficient $g_c$ to equal the equalizer coefficient $g_{11}$, the programmable current source 708 and the differential pair formed by the transistor Q7 and the transistor Q8 are no longer necessary and may be removed from the transistor level implementation 750 of a current domain implementation of a single tap non-linear decision feedback equalizer with digital to analog converter sharing.

Figure 8B:
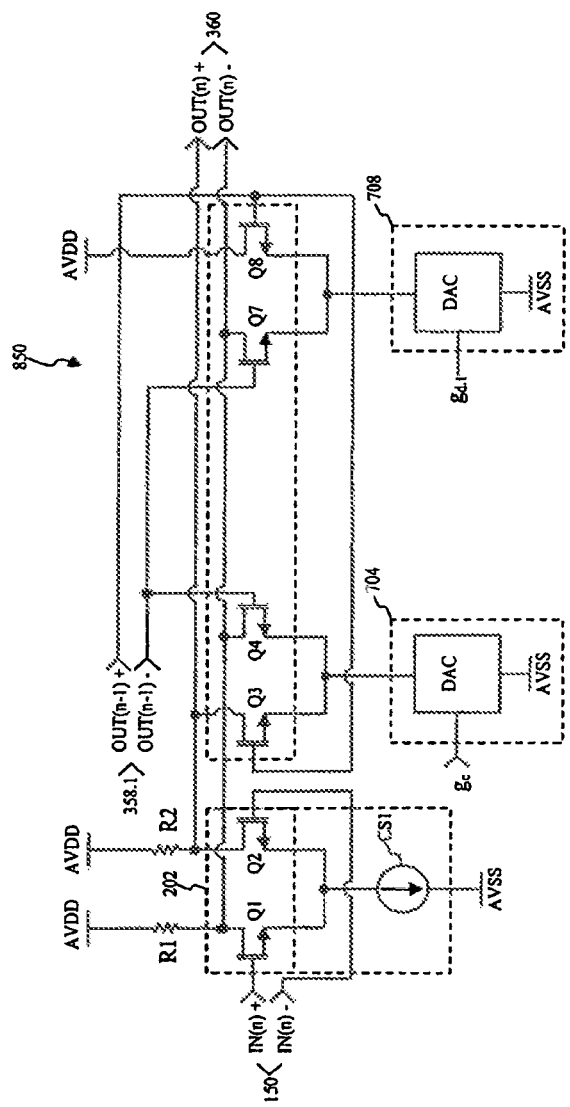
FIG. 8B is an illustration of a transistor level implementation of a current domain implementation of a single tap non-linear decision feedback equalizer with digital to analog converter sharing according to a further exemplary embodiment of the present invention.

FIG. 8B is an illustration of a transistor level implementation 850 of a current domain implementation of a single tap non-linear decision feedback equalizer with digital to analog converter sharing according to a further exemplary embodiment of the present invention. In this exemplary embodiment, the common equalizer coefficient $g_c$ is chosen to equal the equalizer coefficient $g_{10}$ allowing for generation of the equalizer coefficient $g_{11}$ by adding the common equalizer coefficient $g_c$ with differential equalization coefficient $g_{d.1}$. In other words, by choosing the equalizer coefficient $g_c$ to equal the equalizer coefficient $g_{10}$, the programmable current source 706 and the differential pair formed by the transistor Q5 and the transistor Q6 are no longer necessary and may be removed from the transistor level implementation 750 of a current domain implementation of a single tap non-linear decision feedback equalizer with digital to analog converter sharing.

Figure 9:
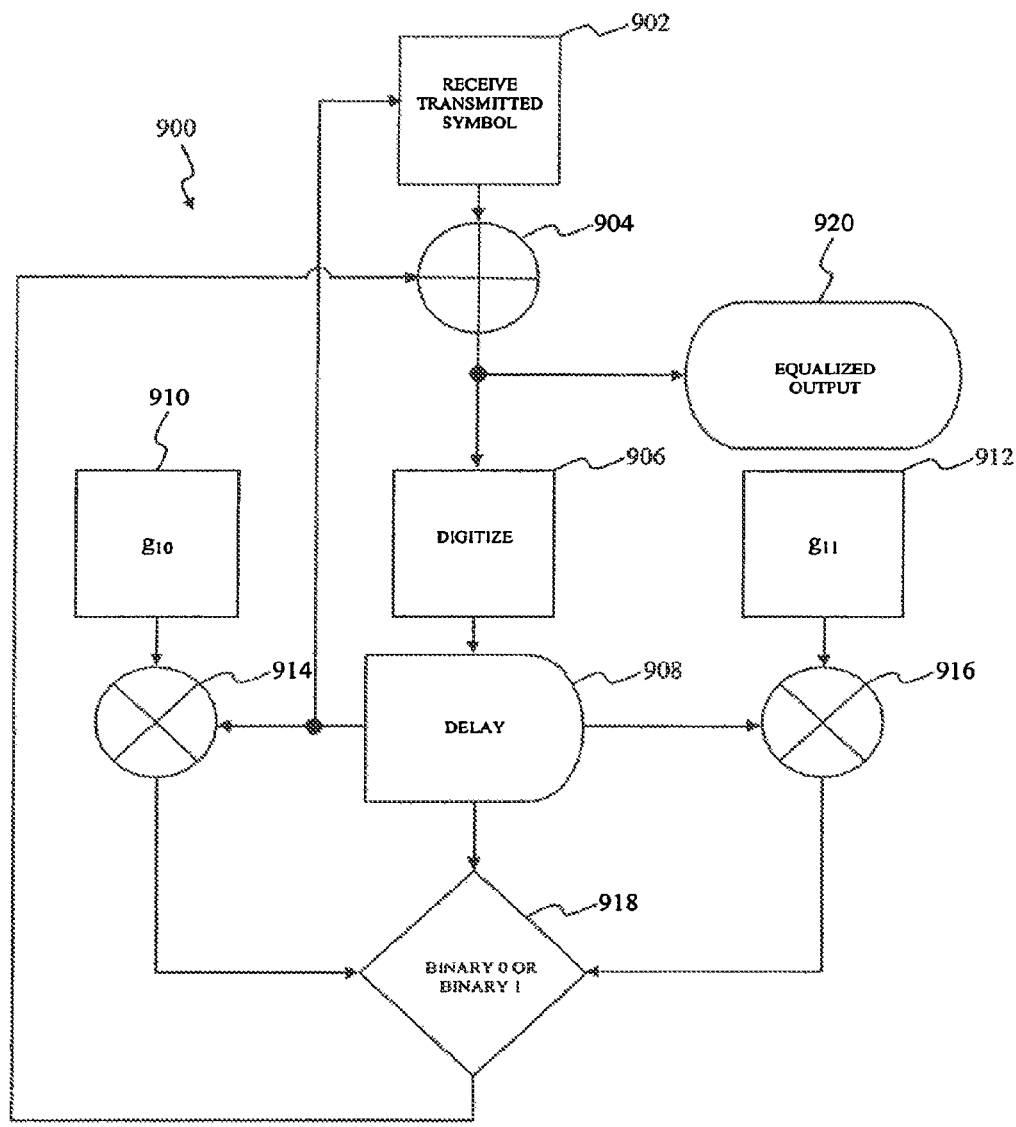
FIG. 9 is a flowchart of exemplary operational steps of a non-linear decision feedback equalizer according to an aspect of the present invention.

FIG. 9 is a flowchart 900 of exemplary operational steps of a non-linear decision feedback equalizer according to an aspect of the present invention. The invention is not limited to this operational description. Rather, it will be apparent to persons skilled in the relevant art(s) from the teachings herein that other operational steps are within the scope and spirit of the present invention. The following discussion describes the steps in FIG. 9.

At step 902, a transmitted symbol is received by a non-linear decision feedback equalizer. The transmitted symbol is in the form of logic signals based on the binary number system. The two symbols most commonly chosen to represent the two logic values taken on by binary symbols are binary zero and binary one. The transmitter may be implemented to encode a transmitted information signal according to an on-off signaling scheme whereby the symbol binary one is represented by transmitting a symbol of constant amplitude for the duration of the symbol, and symbol binary zero is represented by switching off the symbol. The transmitter may also be implemented to encode the transmitted information signal according to a non-return-to-zero (NRZ) scheme whereby symbols of equal positive and negative amplitudes represent the symbols binary one and binary zero.

The communication channel may introduce either linear or non-linear distortion into the transmitted symbol causing a received symbol to differ from the transmitted symbol. The distortion caused by a non-linear communication channel associated with the received symbols is not symmetrical. In other words, the interference impressed onto the received symbol is asymmetrical or dissimilar and depends on whether the received symbol is a binary zero or a binary one. As a result, separate equalization coefficients are required depending on whether the received symbol is a binary zero or a binary one.

At step 904, the equalized output, denoted as step 920, is generated by combining the received transmitted symbol of step 902 with the distortion caused by the linear and the non-linear communication channel impressed upon a previous received symbol from step 918. The equalized output contains substantially less distortion when compared with the received information symbol in the presence of either the linear or non-linear communication channel.

At step 906, the equalized output is digitized. A slicer, such as slicer module 104, may be used to digitize the equalized output. In this step, a determination is made whether the equalized output represents a binary zero or a binary one by comparing the equalized output to a threshold value. The threshold value may be adjusted according to the encoding of the transmitted information signal. For example, if the transmitted information signal is encoded according to the NRZ scheme, the threshold value may be assigned to the statistical mean of the positive and negative amplitudes representing the symbols binary one and binary zero. In an exemplary embodiment, the symbols of the equalized output that are greater than the threshold value are assigned to binary one, while the symbols of the equalized output that are less than the threshold are assigned to binary zero.

At step 908, an output of step 906 is delayed by the duration of a transmitted symbol. Delaying the digitized output for the duration of a transmitted symbol allows for correction for the distortion caused by the linear and non-linear communication channel in a next symbol in the received data stream caused by the current symbol of the received data stream. In other words, the remaining steps determine the amount of distortion in the current symbol impressed upon the next symbol in the received data stream and remove the determined amount of distortion from the next symbol in the received data stream. At the conclusion of step 908, the non-linear decision feedback equalizer proceeds to steps 914, 916, and 918 and reverts back to step 902.

At step 910, the equalization coefficient $g_{10}$ is generated. Any suitable means may be used to generate equalization coefficient $g_{10}$ such as a least means square (LMS) algorithm to provide an example. Similarly, at step 912, the equalization coefficient $g_{11}$ is generated. Any suitable means may be used to generate equalization coefficient $g_{11}$ such as a least means square (LMS) algorithm to provide an example. The equalization coefficient $g_{10}$ of step 910 and the equalization coefficient $g_{11}$ of step 912 may be generated simultaneously or individually after a determination of whether the output of step 908 is a binary one or a binary zero is made.

At step 914, the equalization coefficient $g_{10}$ of step 910 is multiplied by the output of step 908. The multiplication of the equalization coefficient $g_{10}$ with the output of step 908 represents the distortion caused by the linear and the non-linear communication channel impress upon the output of step 908 when the output of step 908 corresponds to a binary zero. Similarly, at step 916, the equalization coefficient $g_{11}$ of step 912 is multiplied by the output of step 908. The multiplication of the equalization coefficient $g_{10}$ with the output of step 908 represents the distortion caused by the linear and the non-linear communication channel impress upon the output of step 908 when the output of step 908 corresponds to a binary one.

At step 918, the symbol content of the output of step 908 is determined. If the output of step 908 is a binary zero, step 918 provides the output of step 914 to step 904. Otherwise, if the previous received symbol is a binary one, step 918 provides the output from step 916 to step 904.

CONCLUSION

While various embodiments of the present invention have been described above, it should be understood that they have been presented by way of example, and not limitation. It will be apparent to persons skilled in the relevant arts that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A non-linear decision feedback equalizer having an equalization tap, comprising:
    a first multiplier configured to multiply an output of the equalization tap by a first equalization coefficient having a first magnitude to provide a first logic weighted output;
    a second multiplier configured to multiply the output of the equalization tap by a second equalization coefficient having a second magnitude to provide a second logic weighted output, the second magnitude being different from the first magnitude; and
    a switch configured to select between the first logic weighted output and the second logic weighted output based upon a logic level of the output of the equalization tap.

2. The non-linear decision feedback equalizer of claim 1, wherein the output of the equalization tap is one of a first logic value and a second logic value, and
    wherein the switch is configured to select the first logic weighted output when the output of the equalization tap is at the first logic value, and to select the second logic weighted output when the output of the equalization tap is at the second logic value.

3. The non-linear decision feedback equalizer of claim 2, wherein the first logic value represents a binary zero and the second logic value represents a binary one.

4. The non-linear decision feedback equalizer of claim 2, wherein the first logic value represents a positive amplitude and the second logic value represents a negative amplitude.

5. The non-linear decision feedback equalizer of claim 1, further comprising:
    a combiner configured to combine an output of the switch with an input to provide an equalized output.

6. The non-linear decision feedback equalizer of claim 5, further comprising:
    a slicer module configured to digitize the equalized output according to a threshold to provide a slicer output.

7. The non-linear decision feedback equalizer of claim 6, wherein the equalization tap comprises:
    a delay module configured to delay the slicer output to provide a delayed slicer output as the output of the equalization tap.

8. The non-linear decision feedback equalizer of claim 1, wherein the output of the equalization tap is one of a first logic value and a second logic value, and wherein the non-linear decision feedback equalizer further comprises:
a combiner configured to combine the first logic weighted output with an input when the output of the equalization tap is at the first logic value, and to combine the second logic weighted output with the input when the output of the equalization tap is at the second logic value.

9. The non-linear decision feedback equalizer of claim 1, further comprising:
a first programmable current source configured to provide a first current representative of the first equalization coefficient; and
a second programmable current source configured to provide a second current representative of the second equalization coefficient.

10. The non-linear decision feedback equalizer of claim 9, further comprising:
a voltage to current converter configured to convert an input from a representation in a voltage domain to a representation in a current domain.

11. The non-linear decision feedback equalizer of claim 10, wherein the switch is further configured to select between the first current and the second current based upon the logic level of the output of the equalization tap, and wherein the non-linear decision feedback equalizer further comprises:
a combiner configured to combine an output of the switch with the current domain representation of the input.

12. The non-linear decision feedback equalizer of claim 1, wherein the output of the equalization tap is delayed by a duration of a symbol of an input.

13. A non-linear decision feedback equalizer, comprising:
a converter configured to convert an input from a representation in a first domain to a representation in a second domain to provide a second domain representation of the input;
a first source configured to provide a first representation in the second domain based on a first equalization coefficient;
a second source configured to provide a second representation in the second domain based on a second equalization coefficient, a magnitude of the first equalization coefficient being different from a magnitude of the second equalization coefficient; and
a switch configured to combine the second domain representation of the input with the first representation in the second domain when a digitized representation of the input is at a first logic value, and to combine the second domain representation of the input with the second representation in the second domain when the digitized representation of the input is at a second logic value.

14. The non-linear decision feedback equalizer of claim 13, wherein the first logic value represents a binary zero and the second logic value represents a binary one.

15. The non-linear decision feedback equalizer of claim 13, wherein the first logic value represents a positive amplitude and the second logic value represents a negative amplitude.

16. The non-linear decision feedback equalizer of claim 13, wherein the converter comprises:
a differential transistor pair configured to convert the input from a representation in the first domain to a representation in the second domain.

17. The non-linear decision feedback equalizer of claim 13, wherein the switch comprises:
a first differential transistor pair configured to source the first representation in the second domain when a delayed input value is at the first logic value; and
a second differential transistor pair configured to source the second representation in the second domain when the delayed input value is at the second logic value.

18. The non-linear decision feedback equalizer of claim 17, wherein the converter comprises:
a third differential transistor pair configured to convert the input from a representation in the first domain to a representation in the second domain to provide the second domain representation of the input.

19. A method to reduce distortion impressed upon a received data stream using a delayed data stream, comprising:
selecting, by a decision feedback equalizer, between a first equalization coefficient and a second equalization coefficient based upon a logic level of the delayed data stream to provide a selected equalization coefficient, a magnitude of the second equalization coefficient being different from a magnitude of the first equalization coefficient;
multiplying, by the decision feedback equalizer, the delayed data stream by the selected equalization coefficient to provide a weighted output; and
combining, by the decision feedback equalizer, the weighted output and the received data stream to provide an equalized output.

20. The method of claim 19, wherein the multiplying comprises:
multiplying the delayed data stream by the first equalization coefficient when the delayed data stream is at a first logic level; and
multiplying the delayed data stream by the second equalization coefficient when the delayed data stream is at a second logic level.

21. The method of claim 19, further comprising:
digitizing the equalized: output to provide a digital data stream.

22. The method of claim 21, further comprising:
delaying the digital data stream by a duration of a symbol of the received data stream to provide the delayed data stream.

* * * * *

UNITED STATES PATENT AND TRADEMARK OFFICE
CERTIFICATE OF CORRECTION

PATENT NO. : 8,483,267 B2
APPLICATION NO. : 13/152551
DATED : July 9, 2013
INVENTOR(S) : Afshin Momtaz It is certified that error appears in the above-identified patent and that said Letters Patent is hereby corrected as shown below:

In the Claims:

Column 30, Line 48
Please replace "equalized: output" with --equalized output--.

Signed and Sealed this
Fifteenth Day of October, 2013

Teresa Stanek Rea
*Deputy Director of the United States Patent and Trademark Office*